US012652522B2

(12) United States Patent
Mishra et al.

(10) Patent No.: US 12,652,522 B2
(45) Date of Patent: Jun. 9, 2026

(54) METHOD FOR EXTENDING ONE OR MORE STATIC RESOURCES ASSOCIATED WITH EMBEDDED UNIVERSAL INTEGRATED CIRCUIT CARD

(71) Applicant: SAMSUNG ELECTRONICS CO., LTD., Suwon-si (KR)

(72) Inventors: Bibhuti Ranjan Mishra, Bengaluru (IN); Prasad Basavaraj Dandra, Bengaluru (IN); Pankaj Rathore, Bengaluru (IN); Kangjin Yoon, Suwon-si (KR); Keonyong Ma, Suwon-si (KR); Sujung Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 343 days.

(21) Appl. No.: 18/422,977

(22) Filed: Jan. 25, 2024

(65) Prior Publication Data

US 2024/0251231 A1 Jul. 25, 2024

(30) Foreign Application Priority Data

Jan. 25, 2023 (IN) ............................. 202341005213

(51) Int. Cl.
H04W 8/18 (2009.01)
G06F 9/50 (2006.01)
(52) U.S. Cl.
CPC .......... H04W 8/183 (2013.01); G06F 9/5027 (2013.01)
(58) Field of Classification Search
CPC ............................. H04W 8/183; G06F 9/5027
(Continued)

(56) References Cited

U.S. PATENT DOCUMENTS 9,439,062 B2 * 9/2016 Li ........................... H04W 12/45
2022/0264284 A1 * 8/2022 Kang .................... H04W 8/183
(Continued)

FOREIGN PATENT DOCUMENTS

KR 10-2022-0018892 A 2/2022
KR 10-2022-0068895 A 5/2022
(Continued)

OTHER PUBLICATIONS

ETSI, "Smart Cards; UICC-Terminal interface; Physical and logical characteristics (Release 17)", ETSI Technical Specification 102 221 V17.4.0, Feb. 2023, 201 total pages.
(Continued)

*Primary Examiner* — Jirapon Tulop
(74) *Attorney, Agent, or Firm* — Sughrue Mion, PLLC

(57) ABSTRACT

A method for extending one or more static resources in a multiple enabled profile capable embedded universal integrated circuit card (eUICC) includes receiving a request to allocate at least one first static resource at a first port of the eUICC, determining whether the at least one first static resource is available for allocation, determining whether the eUICC supports a port extension feature, and whether at least one second port of the plurality of ports is available for access, and performing at least one of merging one or more second static resources of the at least one second port with one or more first static resources of the first port, and initiating at least one action associated with the one or more first static resources.

14 Claims, 14 Drawing Sheets

(58) Field of Classification Search
USPC .......................................................... 455/418
See application file for complete search history.

(56) References Cited

U.S. PATENT DOCUMENTS

| | | |
|---|---|---|
| 2022/0329372 A1 | 10/2022 | Lee et al. |
| 2022/0360968 A1 | 11/2022 | Kang et al. |

FOREIGN PATENT DOCUMENTS

| | | | |
|---|---|---|---|
| WO | 2022/031148 A1 | 2/2022 | |
| WO | 2022/080971 A1 | 4/2022 | |

OTHER PUBLICATIONS

GSMA, "RSP Technical Specification Version 3.0", GSM Association, Oct. 19, 2022, 483 total pages.
Samsung R&D Institute UK, "Effective Use Of Resource For MEP", ETSI Draft, SETREQ(23)000050, vol. WG SET REQ SET-REQ, Oct. 11, 2023, 8 pages, XP014471562.
Communication issued on Jun. 27, 2024 by the European Patent Office for European Patent Application No. 24153779.4.

* cited by examiner

FIG. 8

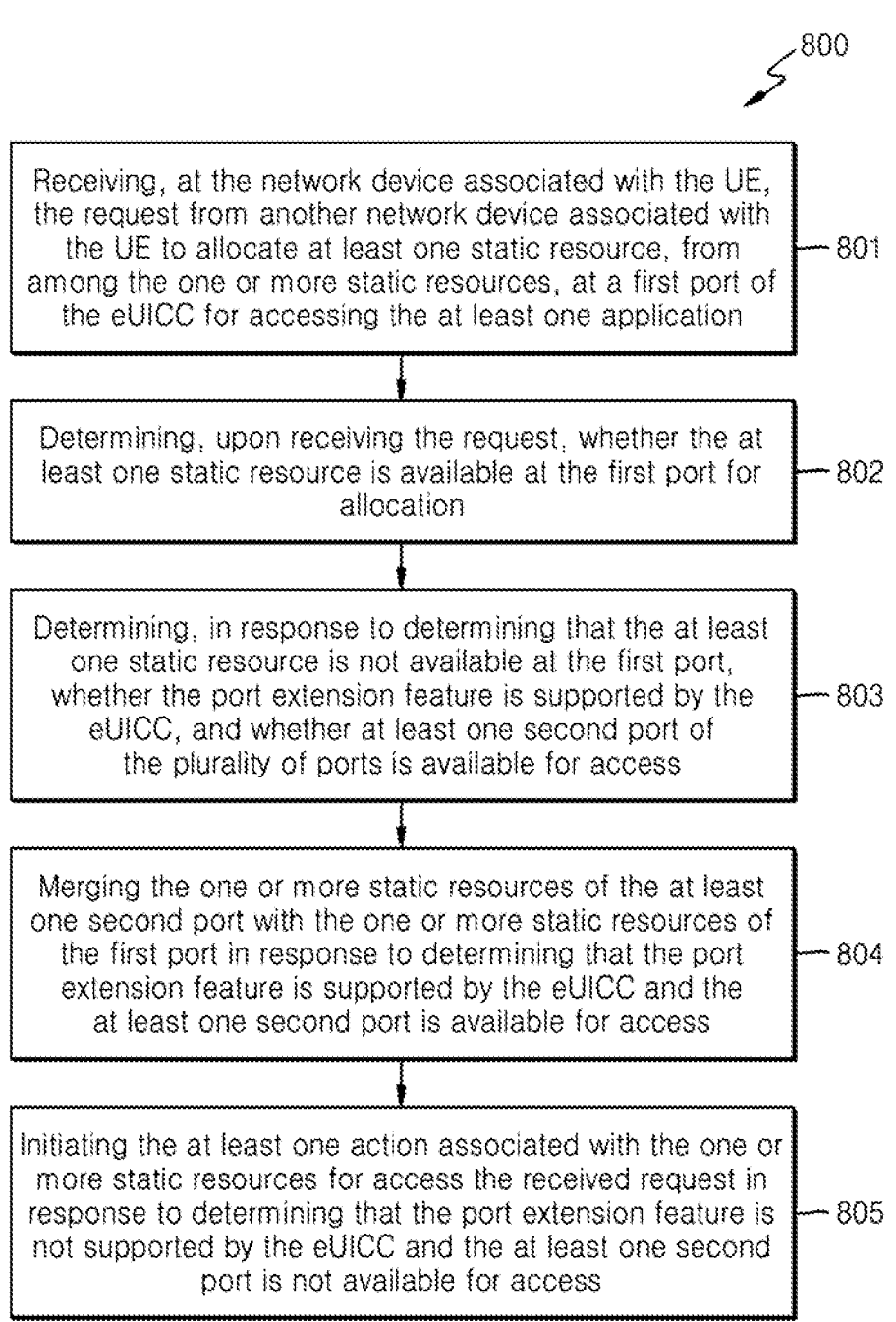

800

Receiving, at the network device associated with the UE, the request from another network device associated with the UE to allocate at least one static resource, from among the one or more static resources, at a first port of the eUICC for accessing the at least one application — 801

Determining, upon receiving the request, whether the at least one static resource is available at the first port for allocation — 802

Determining, in response to determining that the at least one static resource is not available at the first port, whether the port extension feature is supported by the eUICC, and whether at least one second port of the plurality of ports is available for access — 803

Merging the one or more static resources of the at least one second port with the one or more static resources of the first port in response to determining that the port extension feature is supported by the eUICC and the at least one second port is available for access — 804

Initiating the at least one action associated with the one or more static resources for access the received request in response to determining that the port extension feature is not supported by the eUICC and the at least one second port is not available for access — 805

METHOD FOR EXTENDING ONE OR MORE STATIC RESOURCES ASSOCIATED WITH EMBEDDED UNIVERSAL INTEGRATED CIRCUIT CARD

CROSS-REFERENCE TO RELATED APPLICATIONS

This application claims benefit of priority under 35 U.S.C. § 119 to Indian Provisional Patent Application No. 202341005213, filed on Jan. 25, 2023, in the Indian Patent Office, the disclosure of which is incorporated by reference herein in its entirety.

BACKGROUND

1. Field

The present disclosure relates generally to wireless communication systems, and more particularly to a method and a system for extending one or more static resources in a multiple enabled profile (MEP) capable embedded universal integrated circuit card (eUICC).

2. Description of Related Art

An embedded universal integrated circuit card (eUICC) may refer to a secure and programmable subscriber identification module (SIM) card that may be built into an electronic device (e.g., smartphone, internet of things (IoT) device, and the like). The eUICC may be configured to store multiple SIM profiles from different mobile network operators (MNOs) and may include functionality to support multiple enabled profiles (MEP). As used herein, a profile may refer to a profile as described in Trusted Connectivity Alliance (TCA) eUICC Interoperable Format Technical Specification Release 3.3.1. The eUICC with MEP capability may manage and/or support multiple SIM profiles simultaneously. For example, a single eUICC may store SIM profiles from various MNOs (e.g., a first MNO A, a second MNO B, a third MNO C, and the like), thereby allowing an electronic device to connect to and/or use the services of these different mobile network operators without physically changing the SIM card. This flexibility may enable seamless switching between mobile networks and to access various services based on, for example, but limited to, an active SIM profile, a user requirement, and/or one or more network conditions. An example of an eUICC with multiple profiles (e.g., first profile Profile-1 and second profile Profile-2), each of which may be associated with a dedicated port (e.g., first port Port-1 and second port Port-2) and/or an eSIM port as described in Global System for Mobile Communications Association (GSMA) "Remote SIM Provisioning Technical Specification", SGP.22 Release 3.0, and dedicated static resources (e.g., logical channel) for communication, as illustrated in FIG. 1.

Alternatively or additionally, the eUICC may communicate with a modem through a physical interface, enabling the modem to access and/or utilize the subscriber information stored on the eUICC. For example, the physical interface may act as a bridge between the modem and the eUICC. Virtual interface-1 and virtual interface-2 may be communication channels that may allow data to be exchanged between the modem and the eUICC. As another example, the modem may send commands and/or may receive responses from the eUICC, thereby enabling the two components to work together seamlessly. The modem, which may consist of baseband-1 and baseband-2, may be responsible for wireless communication. For example, the modem may perform transmission and/or reception of data over cellular networks. The baseband-1 and baseband-2 may work together to process the signals and/or manage the connection to the network. The baseband-1 and baseband-2 may be core components that may enable the electronic device to communicate with cellular towers and/or other electronic devices over the air.

In the context of eUICC, a growing trend of personalizing applications on SIM cards may have led to an increased demand for resources (e.g., logical channels) supported by the SIM card. As a result, the number of logical channels may need to increase to provide users with a better experience. In some related wireless systems, the logical channel capacity may be set during manufacturing, and may not be changed subsequently. For example, the logical channels may not be configurable at runtime. This limitation may pose a challenge as the number of logical channels in the device is limited, and related systems may be unable to dynamically utilize the resources available with each port, as described with reference FIGS. 2, 3A, and 3B. As the number of applications may continue to increase, the electronic device may run out of logical channels, which may lead to delays, chain delays, and/or denial of service for an end user. In addition, increasing the static resource allocation during the manufacturing of eUICC may not address the issue, as increasing the static resource allocation may lead to wasted (unused) resources. Therefore, there is a need to dynamically utilize all available resources and ports associated with the eUICC to address this challenge.

Some related methods have been explored to manage a logical secure element interface (LSI) command (e.g., as described in European Telecommunications Standards Institute (ETSI) "Smart Cards; UICC-Terminal Interface, Physical and Logical Characteristics", ETSI TS 102 221 Release 17) and ES10c function (e.g., as described in SGP.22) to enable a profile. However, these methods may have certain limitations. For example, the manage LSI command may be utilized to manage LSIs and logical secure elements (LSEs) and may provide a mechanism for multiplexing of application protocol data units (APDUs) of different LSIs, each targeting a separate LSE. Thus, the manage LSI command may enable multiple independent LSEs to reside on a single UICC. That is, the manage LSI command may provide functionality for selecting an LSE for subsequent APDUs, resetting an LSE, setting up the LSI configuration after power up or a reset of the physical interface, and assigning the UICC-contactless frontend (CLF) interface to an LSE and retrieving the LSI of the LSE that has the UICC-CLF interface assigned. Once a configured LSI has been executed, the resource for each supported port may be allocated by the eUICC, regardless of whether any profile is enabled or not. Therefore, in such an example, the resources allocated to the closed/port (e.g., port-3) without an enabled profile may be wasted, as illustrated in FIG. 1. As another example, a function may be used to enable a profile on the eUICC. This function may enable a target profile and may implicitly disable the currently enabled profile on the target port, if any. This function may be performed in an atomic way, thus ensuring that in the event of an error during the command execution, the command may stop and leave the involved profiles in their original states prior to command execution.

Alternatively or additionally, the eUICC may include a default logical channel, hereinafter referred to as a base channel, along with additional logical channels that may always be closed. The modem may use these logical channels by opening a channel, utilizing the channel, and closing the channel once completed. For example, the eUICC may support a limited number of logical channels, typically five (5). In some scenarios, the modem may have already opened all the logical channels for different applications. Examples of different applications may include, but not be limited to, a master file (MF) application, a universal subscriber identity module (USIM) application, an internet protocol (IP) multimedia services identity module (ISIM) application, a public key cryptography standards (PKCS) application, a code division multiple access (CDMA) subscriber identity module (CSIM) application, an integrated secure device routing (ISDR) application, and the like. The modem may access an application (whether the application is present on the card or on a global application (e.g., ISDR)) to perform an operation that may result in the modem being out of logical channels. As a result, the modem may encounter a denial of service and/or may provide a poor user experience, as described with reference to FIG. 2.

FIG. 2 is a sequence diagram illustrating a scenario associated with related wireless systems in the context of allocating one or more static resources (e.g., logical channels).

At operation 201, the USIM/modem may send a manage channel command to select the USIM application and may request the eUICC to open a logical channel for accessing the USIM application. For example, the manage channel command may be in accordance with the manage channel command as described in ETSI TS 102 221. At operation 202, upon receipt of the manage channel command, the eUICC may respond by allocating channel number 01 to the USIM/modem. As a result, the USIM/modem may establish communication with the USIM application through the allocated logical channel (e.g., channel number 01). At operation 203, the USIM/modem may send another manage channel command to select the ISIM application and may request the eUICC to open a logical channel for accessing the ISIM application. At operation 204, upon receipt of the manage channel command, the eUICC may respond by allocating channel number 02 to the USIM/modem. As a result, the USIM/modem may establish communication with the ISIM application through the allocated logical channel (e.g., channel number 02).

At operation 205, the USIM/modem may send a manage channel command to select the PKCS application and may request the eUICC to open a logical channel for accessing the PKCS application. At operation 206, upon receipt of the manage channel command, the eUICC may respond by allocating channel number 03 to the USIM/modem. As a result, the USIM/modem may establish communication with the PKCS application through the allocated logical channel (e.g., channel number 03).

At operation 207, the USIM/modem may receive a profile info list request from an application platform (AP). At operation 208, upon receipt of the profile info list request, the USIM/modem may send a manage channel command to select the ISDR application and may request the eUICC to open a logical channel for accessing the ISDR application. At operation 209, upon receipt of the manage channel command, the eUICC may respond by sending an error status word indicating that no channel may be available to allocate. For example, the eUICC may be unable to allocate a channel due to the static allocation of logical channels to each port. That is, port-1 may be unable to use resources (e.g., logical channels) associated with port-3, even if port-3 has unused logical channels. At operation 210, upon receipt of the error status word indicating that no channel is available, the USIM/modem may send an error response to the AP, which may result in a denial of service.

As another example, the modem may have already enabled all logical channels for different applications (e.g., MF, USIM, ISIM, PKCS, and CSIM) and the modem may need to close any of the logical channels and then reopen the logical channel to select the desired application. Once the operation is completed, the modem may again need to close and reopen the logical channel to return to the previous context. The closing and reopening of the logical channels may need additional APDU exchanges that may delay the gathering of information that may need to be provided to the user (e.g., a getprofileInfo command as described in SGP.22) such that a local profile assistant (LPA) (e.g., as described in SGP.22) may boot up with a proper user interface. These added APDU exchanges may increase the total time needed to provide the user with the services requested through the APDU. The added delay may be more pronounced in a $T_0$ transmission protocol when compared to a Ti transmission protocol. The increased APDU exchange between the modem and the card may significantly delay the user experience, as described with reference to FIGS. 3A and 3B.

FIGS. 3A and 3B are sequence diagrams illustrating another scenario associated with related wireless systems in the context of allocating one or more static resources (logical channels).

Referring to FIG. 3A, at operation 301, the USIM/modem may send a manage channel command to select the USIM application and may request the eUICC to open a logical channel for accessing the USIM application. At operation 302, upon receipt of the manage channel command, the eUICC may respond by allocating channel number 01 to the USIM/modem. As a result, the USIM/modem may establish communication with the USIM application through the allocated logical channel (e.g., channel number 01). At operation 303, the USIM/modem may send a manage channel command to select the ISIM application and may request the eUICC to open a logical channel for accessing the ISIM application. At operation 304, upon receipt of the manage channel command, the eUICC may respond by allocating channel number 02 to the USIM/modem. As a result, the USIM/modem may establish communication with the ISIM application through the allocated logical channel (e.g., channel number 02).

At operation 305, the USIM/modem may send a manage channel command to select the PKCS application and may request the eUICC to open a logical channel for accessing the PKCS application. At operation 306, upon receipt of the manage channel command, the eUICC may respond by allocating channel number 03 to the USIM/modem. As a result, the USIM/modem may establish communication with the PKCS application through the allocated logical channel (e.g., channel number 03). At operation 307, the USIM/modem may receive a profile info list request from an application platform (AP). At operation 308, upon receipt of the profile info list request, the USIM/modem may send a manage channel command to select the ISDR application and may request the eUICC to open a logical channel for accessing the ISDR application. At operation 309, upon receipt of the manage channel command, the eUICC may respond by sending an error status word indicating that no channel may be available to allocate. At operation 310, upon receipt of the error status word indicating that no channel is available, the USIM/modem may send an error response to the AP.

At operations 311A and 311B, the eUICC may receive a select application command with the P2 indication for the termination of a session from the USIM/modem, the eUICC may respond by sending a select response with a status word of 9000 or 91xx back to the USIM/modem. The status word 9000 may indicate that the select response was successfully executed without any errors. Alternatively or additionally, the status word 91xx, may indicate that the select response was partially successful, and additional information may be available in the response data. At operation 312, the USIM/modem may send a manage channel command to select the PKCS application and may request the eUICC to close a logical channel for accessing the PKCS application. At operations 313, 314, and 315, upon receipt of the manage channel command, the eUICC may respond by sending a success response for manage channel close to the USIM/modem. As a result, the USIM/modem may establish a new communication for the ISDR application through the allocated logical channel (e.g., channel number 03).

At operation 316, upon detection of the new communication, the USIM/modem may send a success status word to the AP. At operations 317, 318, 319, and 320, referring to FIGS. 3A and 3B, the AP may receive a success status word from the USIM/modem, and may send an enhanced service 10 (ES10) APDU to the eUICC to perform a specific operation. The ES10 APDU may be and/or may include a command that may trigger a particular operation and/or service within the eUICC, such as, but not limited to, provisioning, updating, or managing subscription profiles. Upon receiving the ES10 APDU command, the eUICC may process the command and may perform the specified operation. The eUICC may send a response for the ES10 operation back to the AP via the USIM/modem. The response may include the result of the operation requested by the AP, may provide information about the success and/or failure of the operation, and may provide relevant data associated with the result of the operation.

At operation 321, the USIM/modem sends a manage channel command to select the ISDR application and may request the eUICC to close a logical channel for accessing the ISDR application. At operations 322, 323, and 324, upon receipt of the manage channel command, the eUICC may respond by sending a success response for the manage channel close to the USIM/modem. As a result, the USIM/modem may establish the previous communication for the PKCS application through the allocated logical channel (e.g., channel number 03).

As another example, the eUICC may provide support for a limited number of logical channels (e.g., five (5) channels). In a scenario in which the eUICC has a port on which a profile is not enabled, such as when using a single enabled SIM in the MEP eUICC, the ports that do not have any enabled profile may also have logical channels associated with the unused ports. However, these logical channels may not be accessed by the USIM/modem. As a result, the memory allocated for these inaccessible logical channels may not utilized efficiently, and thereby, inefficient memory usage.

Thus, there is a need for further improvements in wireless communication systems, as the increased demand for resources may be constrained by inefficient memory usage. Improvements are presented herein. These improvements may also be applicable to other telecommunication technologies and the telecommunication standards that employ these technologies.

SUMMARY

This summary is provided to introduce a selection of concepts, in a simplified format, that are further described in the detailed description of the present disclosure. This summary is neither intended to identify key or essential concepts of the present disclosure nor is it intended for determining the scope of the present disclosure.

According to an aspect of the present disclosure, a method for extending one or more static resources in a multiple enabled profile (MEP) capable embedded universal integrated circuit card (eUICC) includes receiving, by a first network device associated with a user equipment (UE) and from a second network device associated with the UE, a request to allocate at least one first static resource, from among the one or more static resources, at a first port of the eUICC, the at least one first static resource being configured to access at least one application, wherein the eUICC includes a plurality of ports, and each port includes a predefined number of static resources associated with the one or more static resources and a unique profile, determining, based on receiving the request, whether the at least one first static resource is available for allocation at the first port, determining, based on determining that the at least one first static resource is unavailable at the first port, whether the eUICC supports a port extension feature, and whether at least one second port of the plurality of ports is available for access, and managing the one or more static resources by performing at least one of merging one or more second static resources of the at least one second port with one or more first static resources of the first port based on determining that the eUICC supports the port extension feature and that the at least one second port is available for access, and initiating at least one action associated with the one or more first static resources based on determining that the eUICC does not support the port extension feature and that the at least one second port is not available for access.

According to an aspect of the present disclosure, a system for extending one or more static resources in a multiple enabled profile (MEP) capable embedded universal integrated circuit card (eUICC) includes a memory storing instructions, a communicator, and a processor, operably coupled to the memory and the communicator, wherein the instructions are configured, when executed by the processor, to cause the system to receive, by a first network device associated with a user equipment (UE) and from a second network device associated with the UE, a request to allocate at least one first static resource, from among the one or more static resources, at a first port of the eUICC, the at least one first static resource being configured to access at least one application, wherein the eUICC includes a plurality of ports, and each port includes a predefined number of static resources associated with the one or more static resources and a unique profile, determine, based on the request, whether the at least one first static resource is available for allocation at the first port, determine, based on a determination that the at least one first static resource is unavailable at the first port, whether the eUICC supports a port extension feature, and whether at least one second port of the plurality of ports is available for access, and manage the one or more static resources, wherein to manage the one or more static resources includes to merge the one or more second static resources of the at least one second port with one or more first static resources of the first port based on a determination that the eUICC supports the port extension feature and that the at least one second port is available for access, and initiate at least one action associated with the one or more first static resources based on a determination that the eUICC does not support the port extension feature and that the at least one second port is not available for access.

To further clarify the advantages and features of the present disclosure, a more particular description of the present disclosure may be rendered by reference to specific embodiments thereof, which are illustrated in the appended drawings. It is to be understood that these drawings depict typical embodiments of the present disclosure and are therefore not to be considered limiting of its scope. The present disclosure is described and explained with additional specificity and detail in the accompanying drawings.

BRIEF DESCRIPTION OF THE DRAWINGS

These and other features, aspects, and advantages of the present disclosure may be more apparent when the following description taken in conjunction with the accompanying drawings, in which:

FIG. 8 is a flow diagram illustrating a method for extending the one or more static resources in the MEP capable eUICC, according to an embodiment.

DETAILED DESCRIPTION

Figure 1:
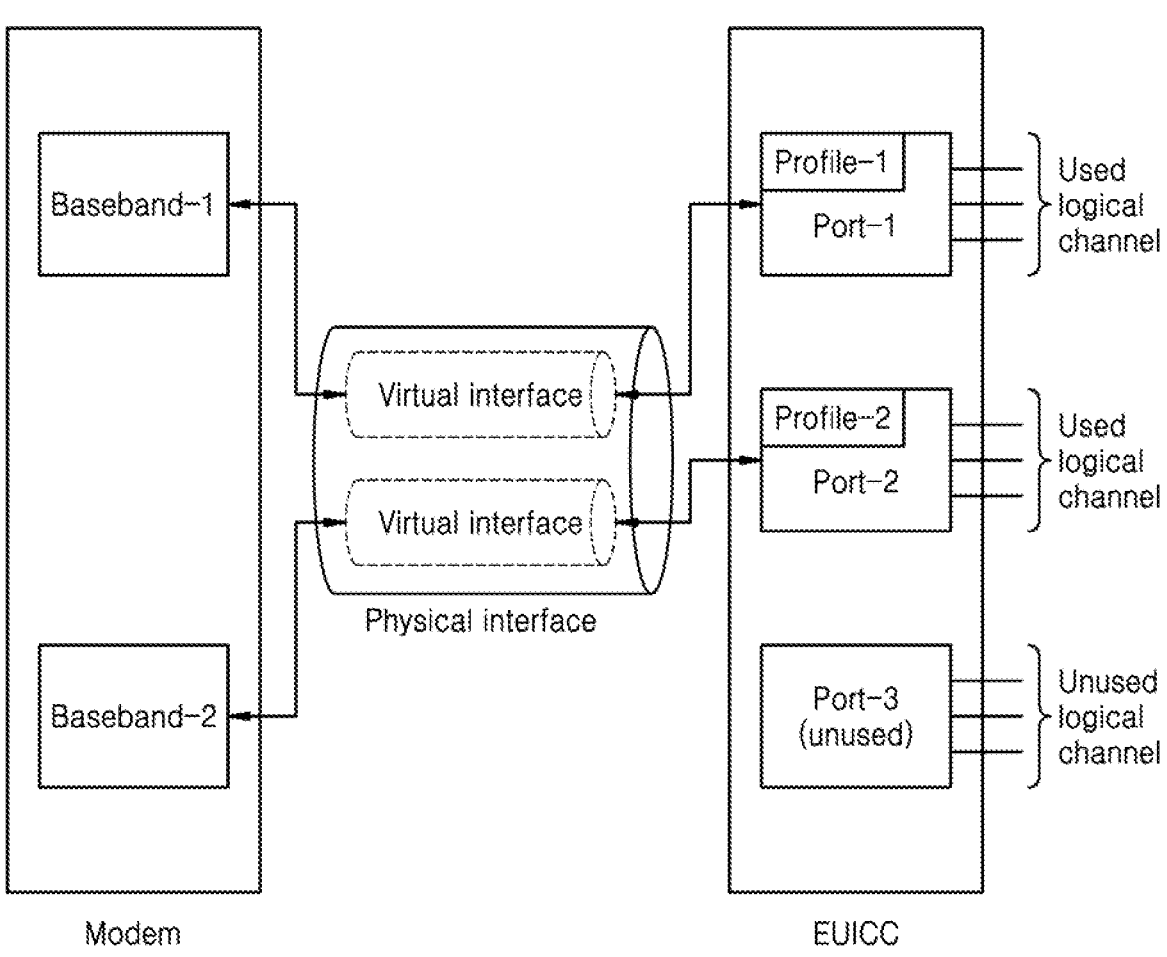
FIG. 1 illustrates a block diagram of an related system associated with a multiple enabled profile (MEP) capable embedded universal integrated circuit card (eUICC) for allocating one or more static resources.
Figure 2:
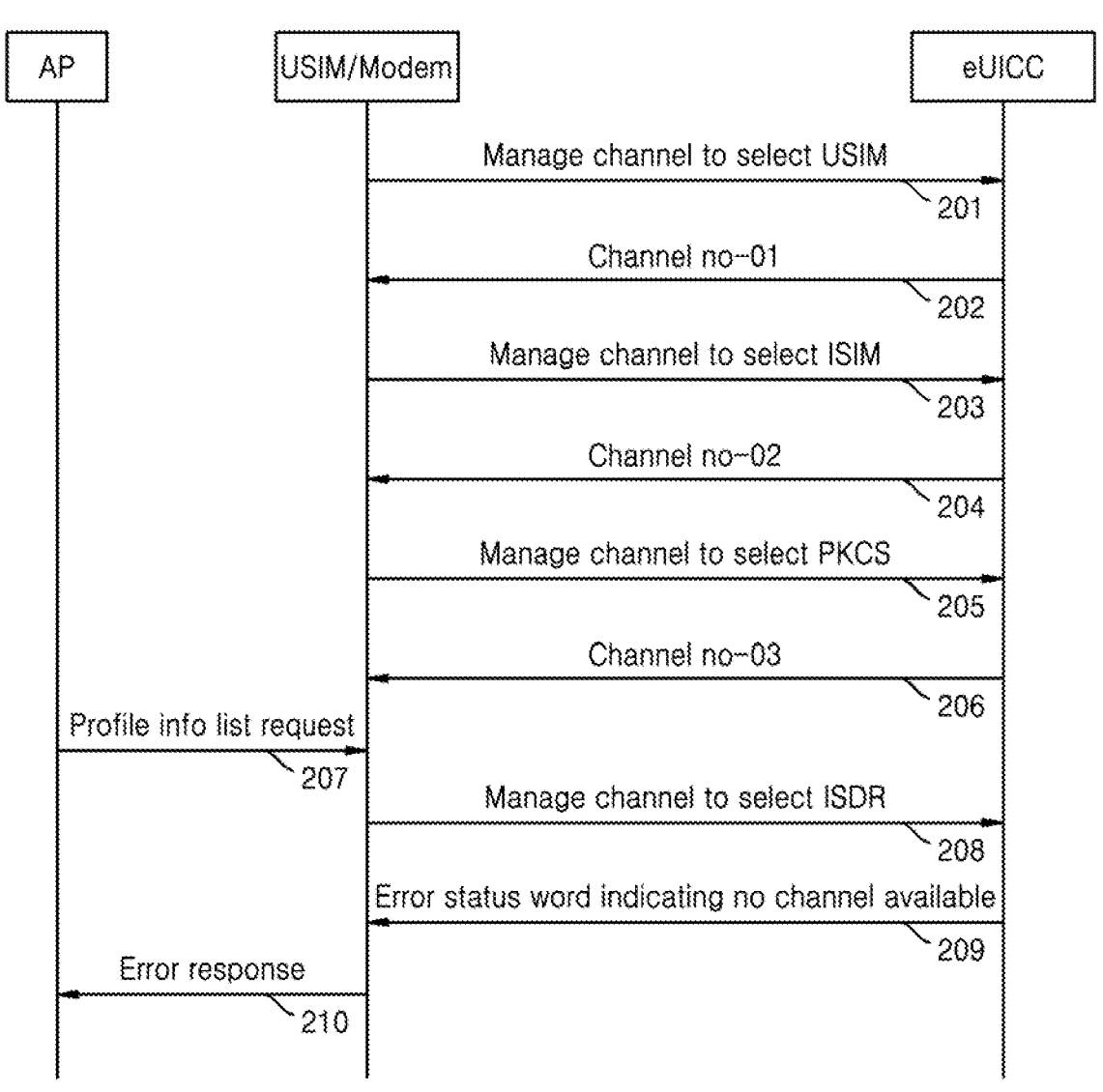
FIG. 2 is a sequence diagram illustrating a scenario associated with related wireless systems in the context of allocating the one or more static resources.
Figure 3A:
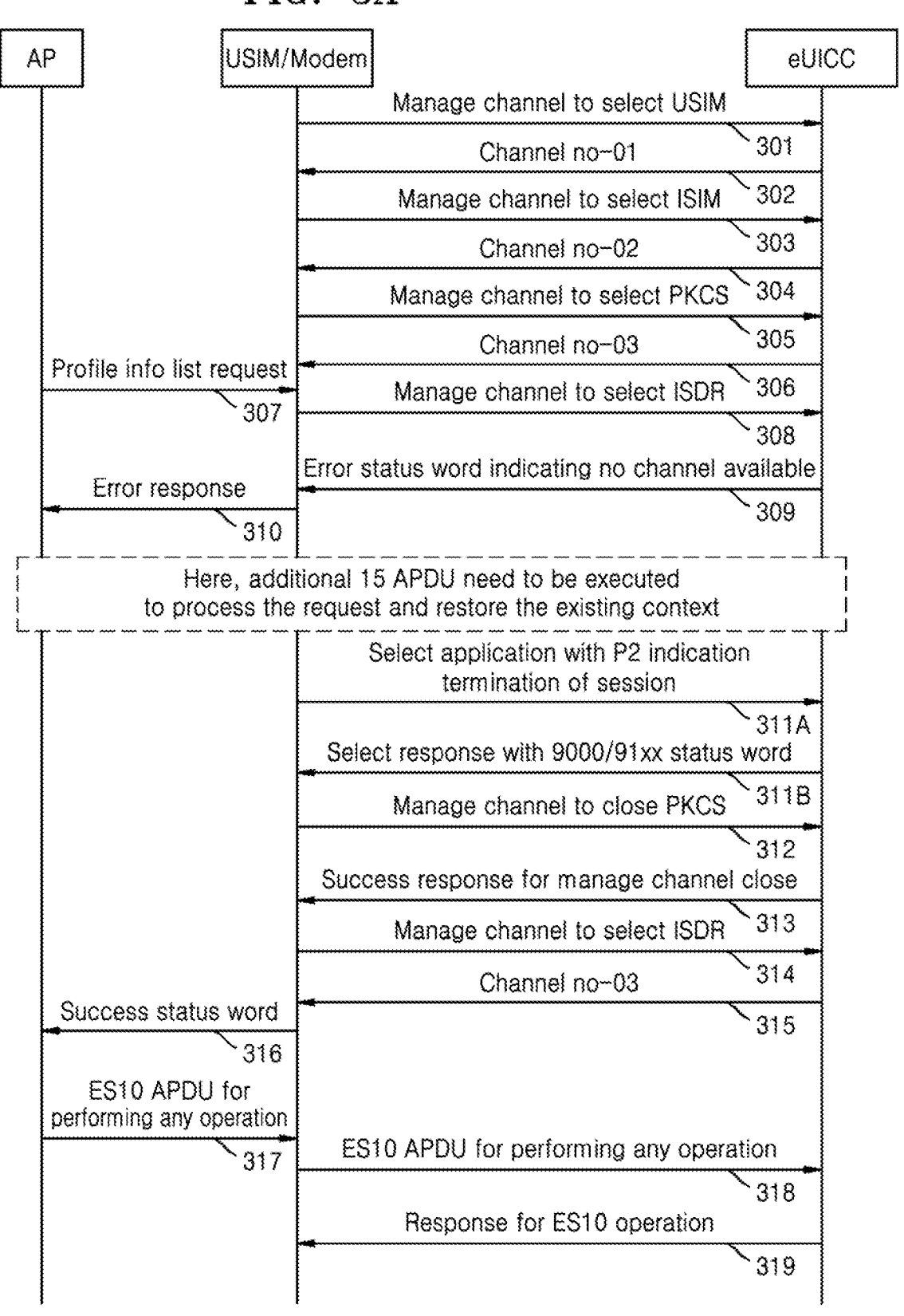
FIGS. 3A and 3B are sequence diagrams illustrating another scenario associated with the related wireless systems in the context of allocating the one or more static resources.
Figure 3B:
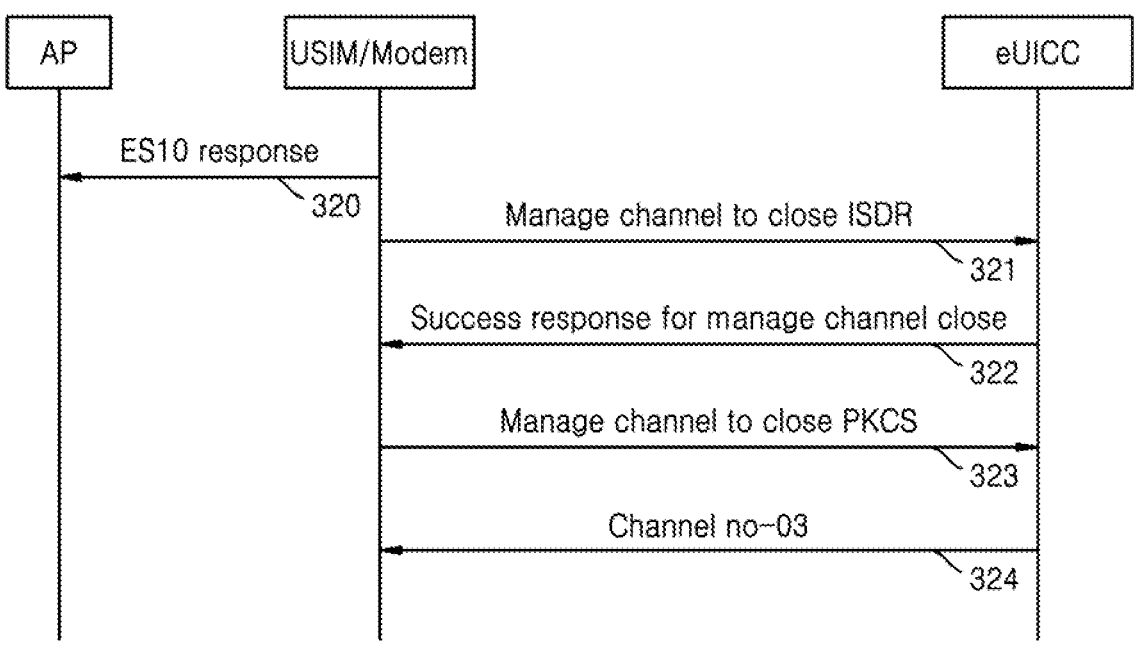

For the purpose of promoting an understanding of the principles of the present disclosure, reference may now be made to the embodiments illustrated in the drawings and specific language may be used to describe the same. It is to be understood that no limitation of the scope of the present disclosure is thereby intended, such that the present disclosure may include alterations and further modifications in the illustrated system, and/or further applications of the principles of the present disclosure as illustrated therein being contemplated as would normally occur to one skilled in the art to which the present disclosure relates.

It may be understood by those skilled in the art that the foregoing general description and the following detailed description are explanatory of the present disclosure and are not intended to be restrictive thereof.

Further, skilled artisans may appreciate that elements in the drawings are illustrated for simplicity and may not have necessarily been drawn to scale. For example, the flow charts illustrate the method in terms of the most prominent steps or operations involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that may be readily apparent to those of ordinary skill in the art having the benefit of the description herein.

Reference throughout this specification to "an aspect", "another aspect", "an embodiment", "one embodiment", "another embodiment", or similar language may indicate that a particular feature, structure, or characteristic described in connection with the embodiment is included in at least one embodiment of the present disclosure. Thus, appearances of the phrase "in an embodiment", "in one embodiment", "in another embodiment", and similar language throughout this specification may, but do not necessarily, all refer to the same embodiment.

The terms "comprise", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments may be combined with one or more other embodiments to form new embodiments. The term "or" as used herein, may refer to a non-exclusive or unless otherwise indicated. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. The examples used herein are intended merely to facilitate an understanding of ways in which the embodiments herein may be practiced and to further enable those skilled in the art to practice the embodiments herein. Accordingly, the examples should not be construed as limiting the scope of the embodiments herein.

As is traditional in the field, embodiments may be described and illustrated in terms of blocks that carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the present disclosure. Likewise, the blocks of the embodiments may be physically combined into more complex blocks without departing from the scope of the present disclosure.

In the present disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, and the like may be used herein to describe various elements, these elements should not be limited by these terms. These terms are generally only used to distinguish one element from another.

Referring now to the drawings, and more particularly to FIGS. 4 to 8, where similar reference characters denote corresponding features consistently throughout the figures, there are shown preferred embodiments.

Figure 4:
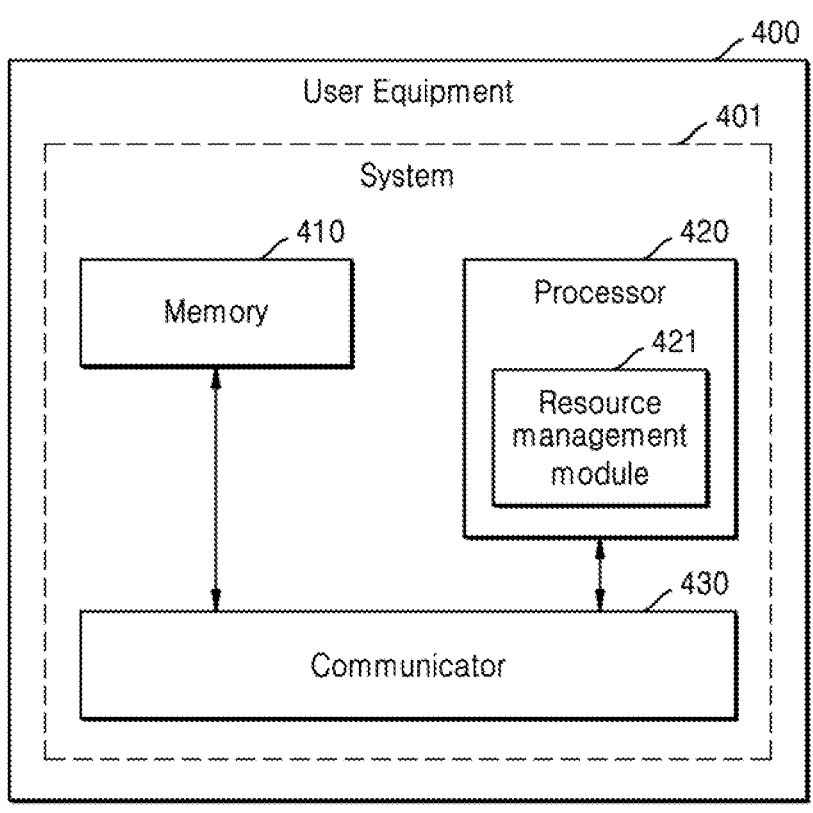
FIG. 4 illustrates a block diagram of a user equipment (UE) for extending one or more static resources in a MEP capable eUICC, according to an embodiment.

FIG. 4 illustrates a block diagram of a user equipment (UE) 400 for extending one or more static resources in a multiple enabled profile (MEP) capable embedded universal integrated circuit card (eUICC), according to an embodiment. Examples of the UE 400 may include, but not be limited to, a smartphone, a tablet computer, a personal digital assistance (PDA), an Internet of Things (IOT) device, a wearable device, and the like.

In one embodiment, the UE 400 may include a system 401. The system 401 may include a memory 410, a processor 420, and a communicator 430. In one or more embodiments, the system 401 may be implemented on one or multiple electronic devices/network devices.

In one embodiment, the UE 400 may be and/or may include, for example, but be not limited to, one or more network devices such as an application platform (AP) device, universal subscriber identity module (USIM)/modem, an eUICC (e.g., MEP capable eUICC), an embedded subscriber identity module (eSIM), and an integrated subscriber identity module (ISIM). As used herein, the operational capabilities of the eUICC may be substituted with an eSIM, an ISIM, and/or forthcoming subscriber identity module (SIM) technology.

In an embodiment, the memory 410 may store instructions to be executed by the processor 420 for extending the one or more static resources in the MEP capable eUICC, as described in the present disclosure. The memory 410 may include non-volatile storage elements. Examples of such non-volatile storage elements may include, but not be limited to, magnetic hard discs, optical discs, floppy discs, flash memories, forms of electrically programmable memories (EPROM) and/or electrically erasable and programmable (EEPROM) memories. In some embodiments, the memory 410 may be and/or may include a non-transitory storage medium. The term "non-transitory" may indicate that the storage medium is not embodied in a carrier wave and/or a propagated signal. However, the term "non-transitory" should not be interpreted to indicate that the memory 410 is non-movable. In some embodiments, the memory 410 may be configured to store larger amounts of information than the memory. In certain examples, a non-transitory storage medium may store data that may, over time, change (e.g., in random access memory (RAM) or cache). The memory 410 may be and/or may include an internal storage unit, an external storage unit of the UE 400, a cloud storage, and/or any other type of external storage.

The processor 420 may communicate with the memory 410 and the communicator 430. The processor 420 may be configured to execute instructions stored in the memory 410 and to perform various processes for extending the one or more static resources in the MEP capable eUICC, as described in the present disclosure. The processor 420 may include one processor or a plurality of processors, that may be and/or may include, but not be limited to, a general-purpose processor (e.g., a central processing unit (CPU), an application processor, and the like), a graphics-only processing unit (e.g., a graphics processing unit (GPU), a visual processing unit (VPU), and the like), and/or an artificial intelligence (AI) dedicated processor (e.g., a neural processing unit (NPU) and the like).

In an embodiment, the processor 420 may include a resource management module 421 that may execute multiple operations to extend the one or more static resources in the MEP capable eUICC, as described herein. In one embodiment, the resource management module 421 may be associated with the eUICC. The resource management module 421 may be implemented by processing circuitry such as logic gates, integrated circuits, microprocessors, microcontrollers, memory circuits, passive electronic components, active electronic components, optical components, hard-wired circuits, or the like, and may optionally be driven by firmware. The circuits may, for example, be embodied in one or more semiconductor chips, and/or on substrate supports such as printed circuit boards and the like.

In one or more embodiments, the resource management module 421 may be configured to receive, at a network device (e.g., eUICC) associated with the UE 400, a request from another network device (e.g., USIM/modem, AP device, and the like) associated with the UE 400 to allocate at least one static resource, from among the one or more static resources, at a first port of the eUICC for accessing at least one application, as described with reference to FIGS. 6A, 6B, and 7A to 7D. The eUICC may include a plurality of ports, and each port of the plurality of ports may include a predefined number of static resources associated with the one or more static resources and a unique profile, as shown in FIG. 1. An example of the at least one application may include, but not be limited to, a master file (MF) application, a USIM application, an IP multimedia services identity module (ISIM) application, a public key cryptographic standards (PKCS) application, a code division multiple access (CDMA) subscriber identity module (CSIM) application, and an issuer security domain root (ISDR) application.

In one or more embodiments, the resource management module 421 may be configured to determine, upon receiving the request, whether the at least one static resource is available at the first port for allocation, as described with reference to FIGS. 5A, 6A, 6B, and 7A to 7D. The resource management module 421 may be configured to determine, in response to determining that the at least one static resource is not available at the first port, whether a port extension feature is supported by the eUICC, and whether at least one second port of the plurality of ports is available for access, as described with reference to FIGS. 5A, 6A, 6B, and 7A to 7D.

In one or more embodiments, the resource management module 421 may be configured to merge the one or more static resources of the at least one second port with the one or more static resources of the first port in response to determining that the port extension feature is supported by the eUICC and the at least one second port is available for access, as described with reference FIGS. 5A, 5B, 6A, 6B, and 7A to 7D. In one embodiment, upon merging the one or more static resources, the resource management module 421 may enable the unique profile associated with the first port into the at least one second port using an enable profile function (e.g., SGP.22 enableProfile function) for accessing the at least one application associated with the received request. In one embodiment, upon merging the one or more static resources, the resource management module 421 may enable the unique profile associated with the first port into the at least one second port using a proprietary command for accessing the at least one application associated with the received request. The proprietary command may include one or more application protocol data unit (APDU) commands (e.g., select/manage command). In one embodiment, upon merging the one or more static resources, the resource management module 421 may determine whether a task associated with the received request is completed, to access the at least one application. The resource management module 421 may determine retrieving information associated with the first port, wherein the retrieving information may indicate a number of static resources allocated to the first port in response to determining that the task is completed. Alternatively or additionally, the resource management module 421 may release the one or more merged static resources at the first port in response to determining that the task is completed. The resource management module 421 may reallocate the one or more released static resources among the first port and the at least one second port based on an initial static resource configuration.

Figure 7A:
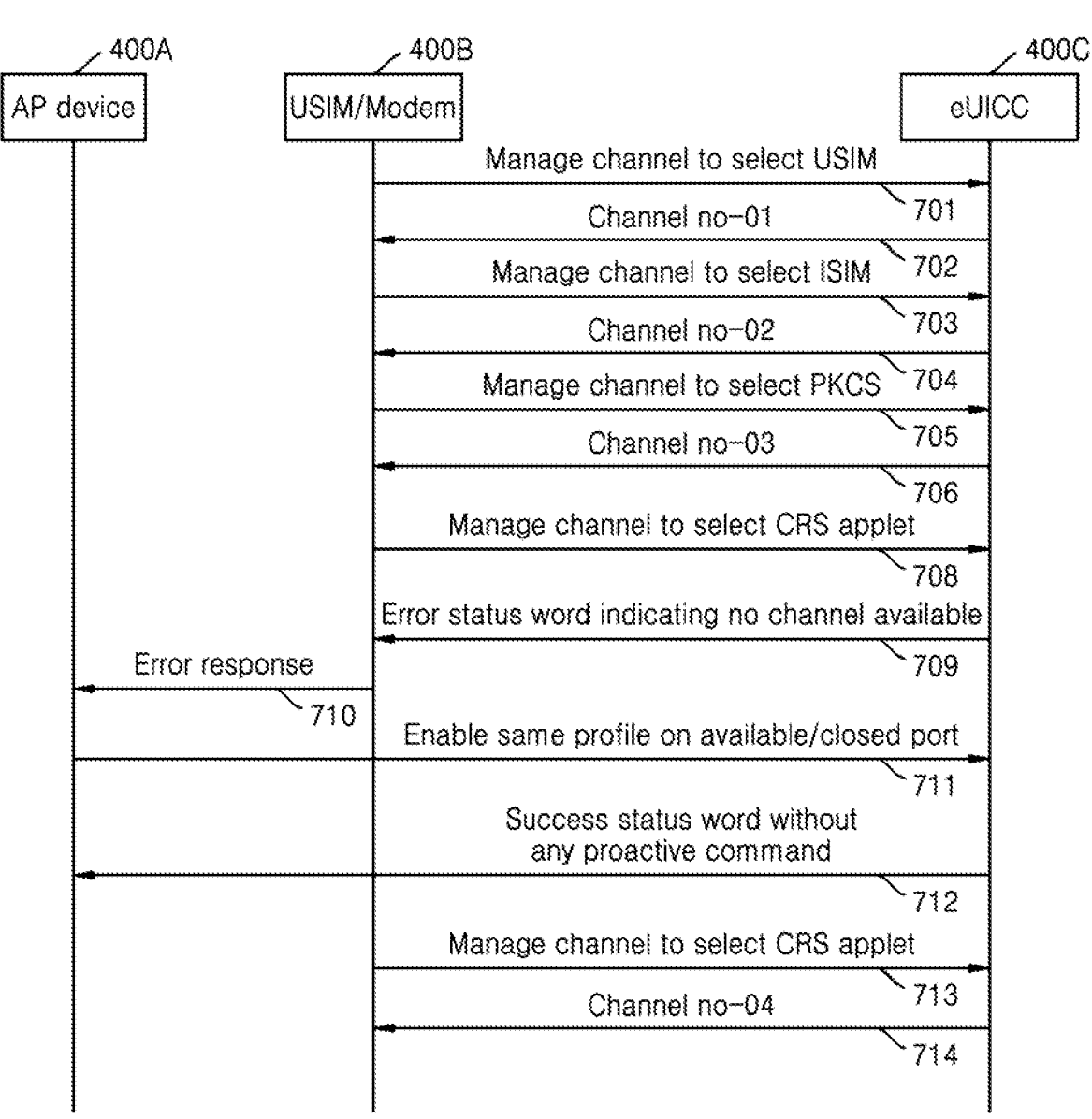
FIGS. 7A to 7D are sequence diagrams illustrating one or more scenarios for extending one or more static resources in the MEP capable eUICC, according to an embodiment.
Figure 7B:
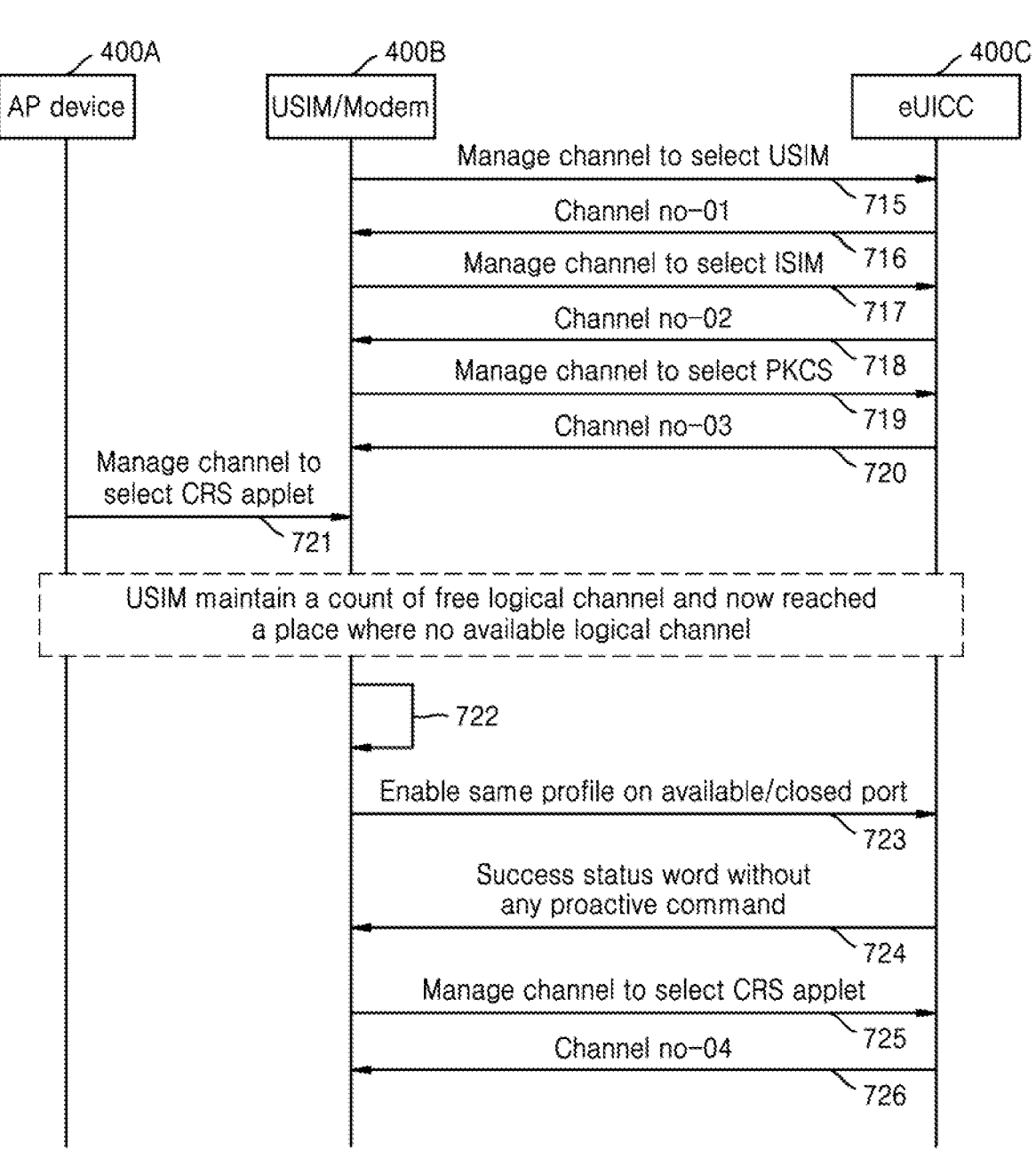
Figure 7C:
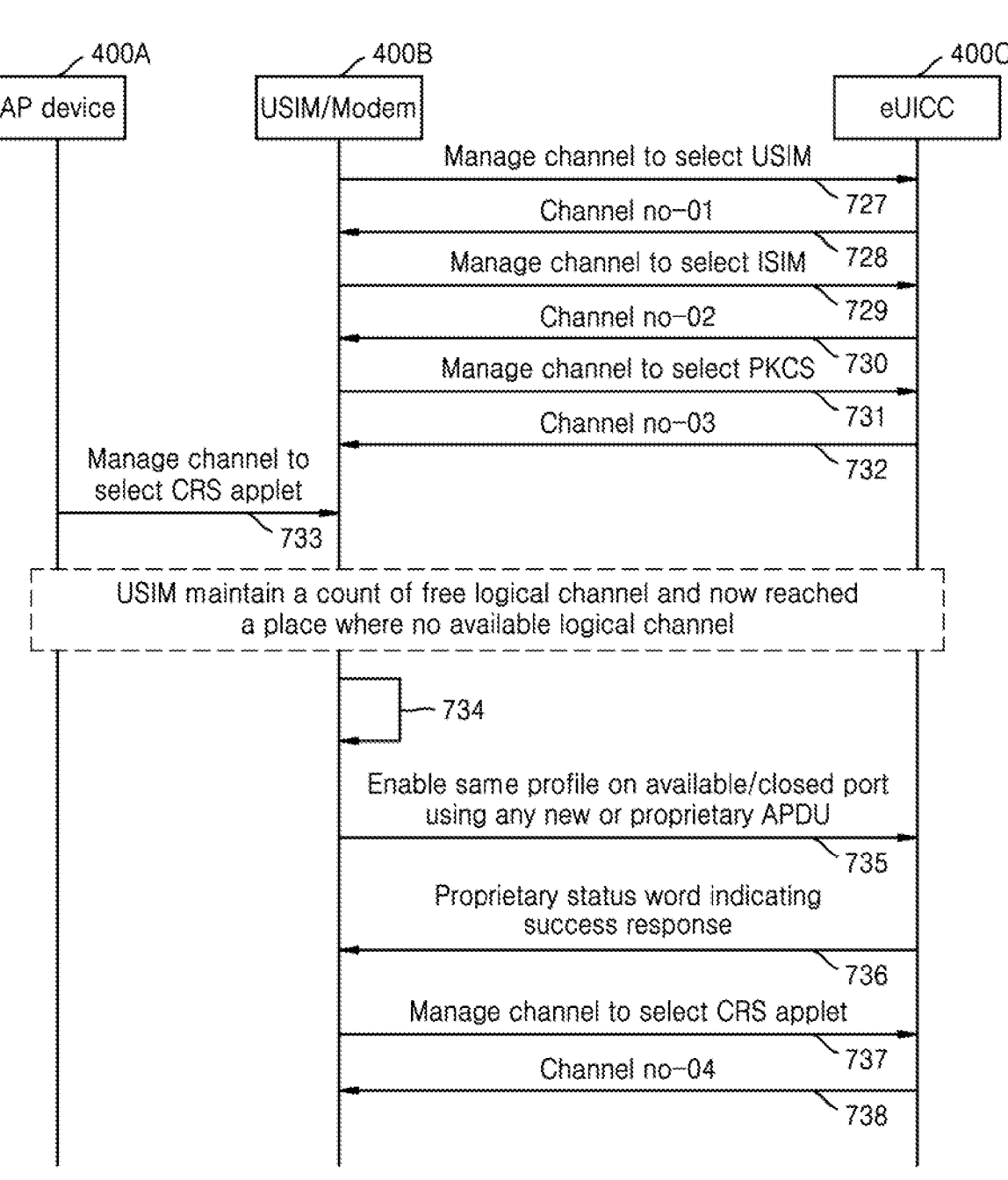
Figure 7D:
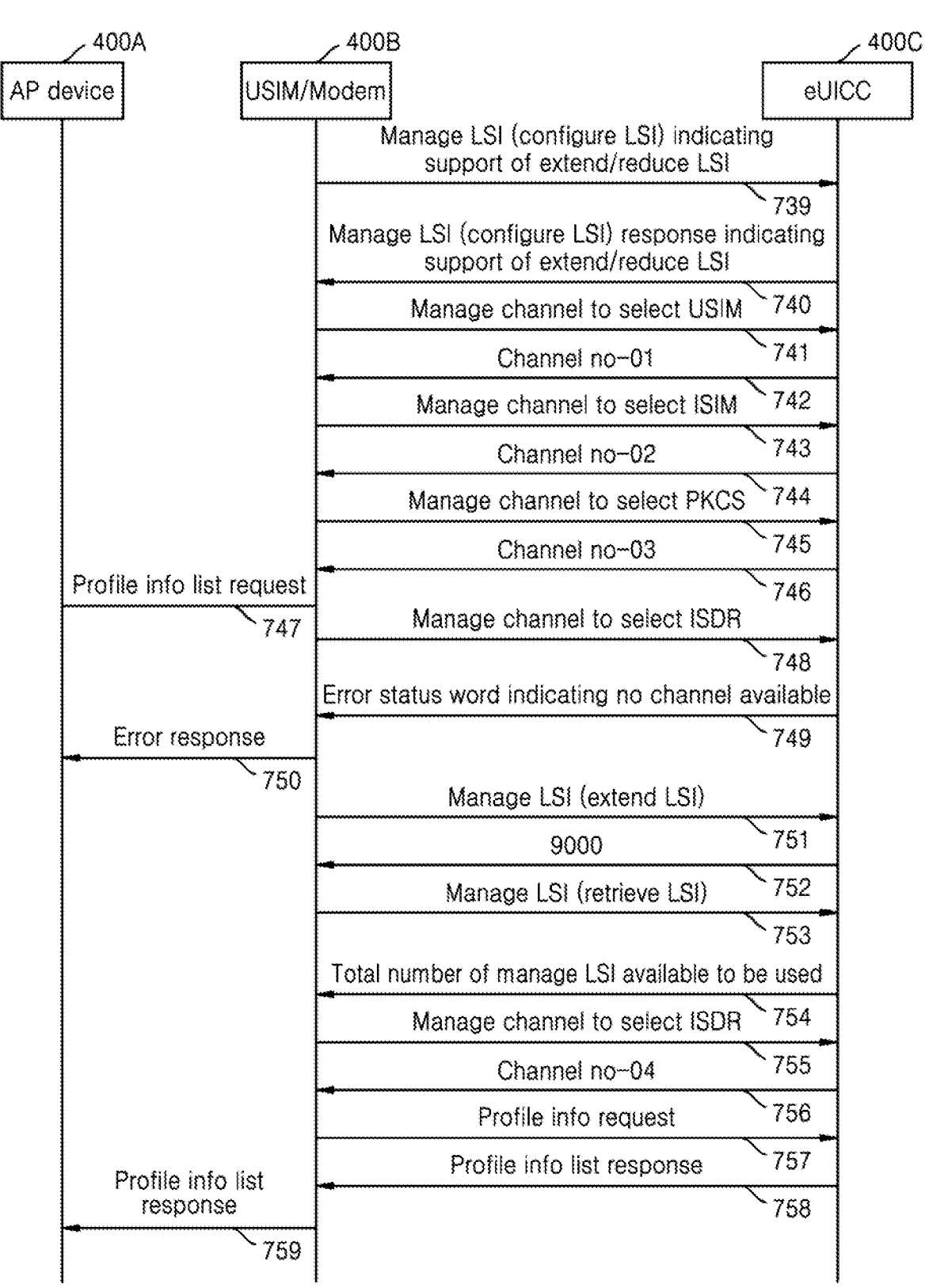

In one or more embodiments, the resource management module 421 may perform one or more operations associated with at least one of a logical secure element (LSE) (e.g., port-1/first port) and a logical secure element interface (LSI), as described in conjunction with FIG. 7D. The LSE may be configured to provide secure storage and process capabilities for sensitive data and the LSI may be configured to provide an interface through which one or more applications and one or more services may interact with the LSE. The one or more operations may include, but not be limited to, an extension operation of the LSI and a reduction operation of the LSI.

In one or more embodiments, the resource management module 421 may be configured to initiate at least one action associated with the one or more static resources for accessing the received request in response to determining that the port extension feature is not supported by the eUICC and that the at least one second port is not available for access, as described with reference to FIGS. 5A, 6A, 6B, and 7A to 7D. The at least one action may include, but not be limited to, sending a rejection message to the AP device associated with the UE in response to the received request along with an appropriate error code, and terminating at least one allocated static resource associated with the first port and reallocating the at least one terminated static resource associated with the first port for accessing the at least one application associated with the received request.

The communicator 430 may be configured for communicating internally between internal hardware components and with external devices (e.g., server) via one or more networks (e.g., radio technology). The communicator 430 may include an electronic circuit specific to a telecommunication standard that enables wired and/or wireless communication.

Although FIG. 4 shows various hardware components of the UE 400, it is to be understood that the present disclosure is not limited thereon. In some embodiments, the UE 400 may include less or more components. Further, the labels and/or names of the components may be used only for illustrative purposes and may not limit the scope of the present disclosure. One or more components may be combined to perform the same or substantially similar functions to extend the one or more static resources in the MEP capable eUICC 400C.

Figure 5A:
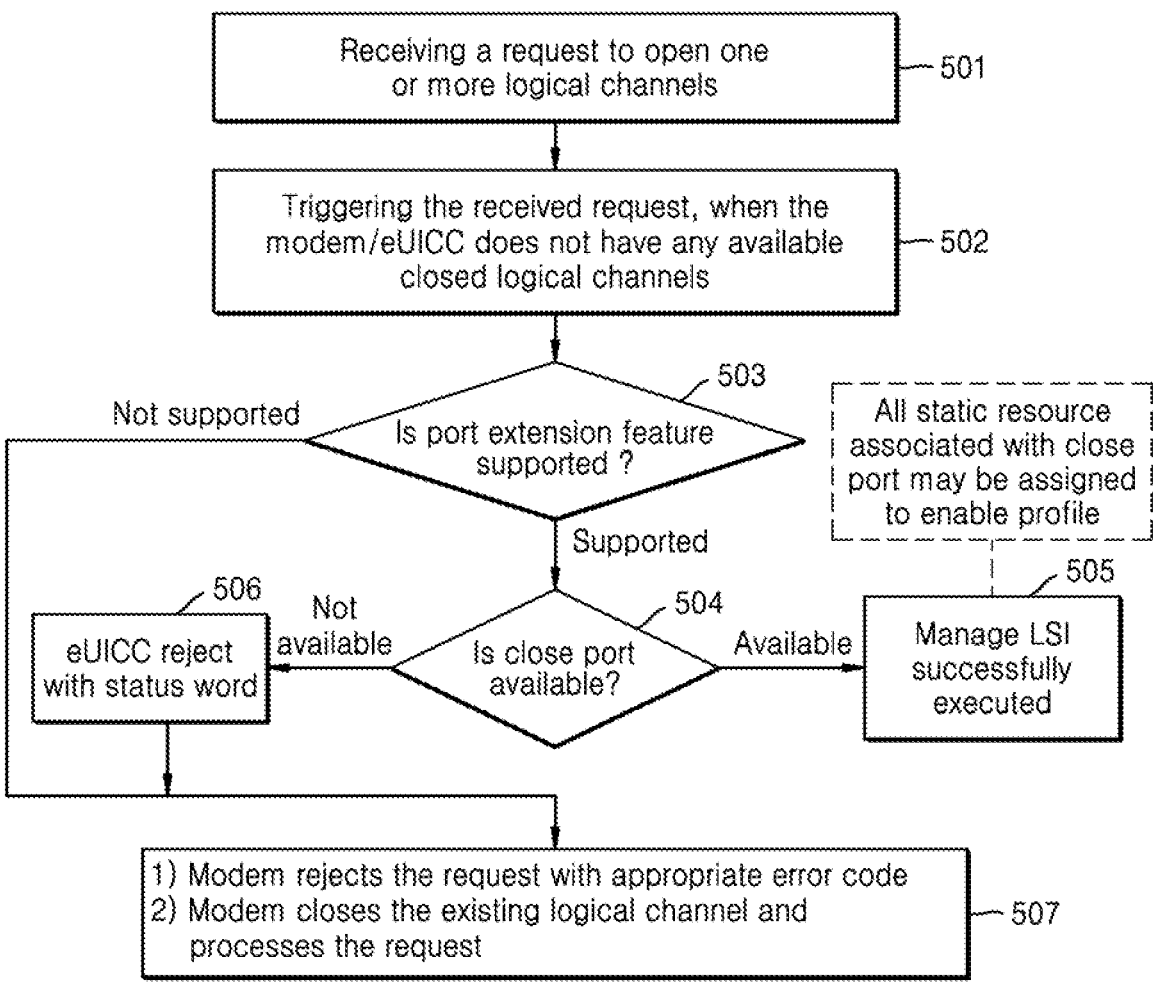
FIG. 5A is a flow diagram illustrating a method for extending the one or more static resources in the MEP capable eUICC, according to an embodiment.

FIG. 5A is a flow diagram illustrating a method 500 for extending the one or more static resources in the MEP capable eUICC, according to an embodiment.

At operation 501, the method 500 may include receiving a request, from one of the AP device, the USIM/modem, to open one or more logical channels at the first port of the eUICC (e.g., MEP capable eUICC) for accessing the at least one application. At operation 502, the method 500 may include triggering the received request when the modem/eUICC does not have available closed logical channels (e.g., at least one static resource). At operation 503, the method 500 may include determining, in response to determining that the at least one static resource is not available at the first port, whether a port extension feature is supported by the eUICC.

At operation 504, the method 500 may include determining, in response to determining that the port extension feature is supported by the eUICC (Supported at operation 503), whether the at least one second port of the plurality of ports is available for access. At operation 507, the method 500 may include performing, in response to determining that the port extension feature is not supported by the eUICC (Not supported at operation 503), one or more operations. The one or more operations may include at least one of the modem rejecting the request with an appropriate error code, and the modem closing the existing logical channel and processing the request. However, these one or more operations may result in a denial of service and/or a longer wait time, which may lead to a degraded user experience.

At operation 505, the method 500 may include managing, in response to determining that the port extension feature is supported by the eUICC and the at least one second port is available for access (Available at operation 504), the one or more static resources (e.g., manage LSI/extend port/merge port) of the at least one second port with the one or more static resources of the first port. At operation 506, the method 500 may include sending, in response to determining that the at least one second port is not available for access (Not available at operation 504), a eUICC rejection with an appropriate status word (e.g., 6985) and then the method 500 may proceed to perform operation 507. The status word included with the eUICC rejection (e.g., 6985) may be a standard response code word that may be used in global platform specifications for secure elements. For example, the standard response code may indicate that conditions of use not satisfied, which may indicate that the command was rejected based on security-related constraints and/or conditions not being met. The various operations of FIG. 5A are further described with reference to FIGS. 6A, 6B, and 7A to 7D, and repeated descriptions may be omitted for the sake of brevity.

Figure 5B:
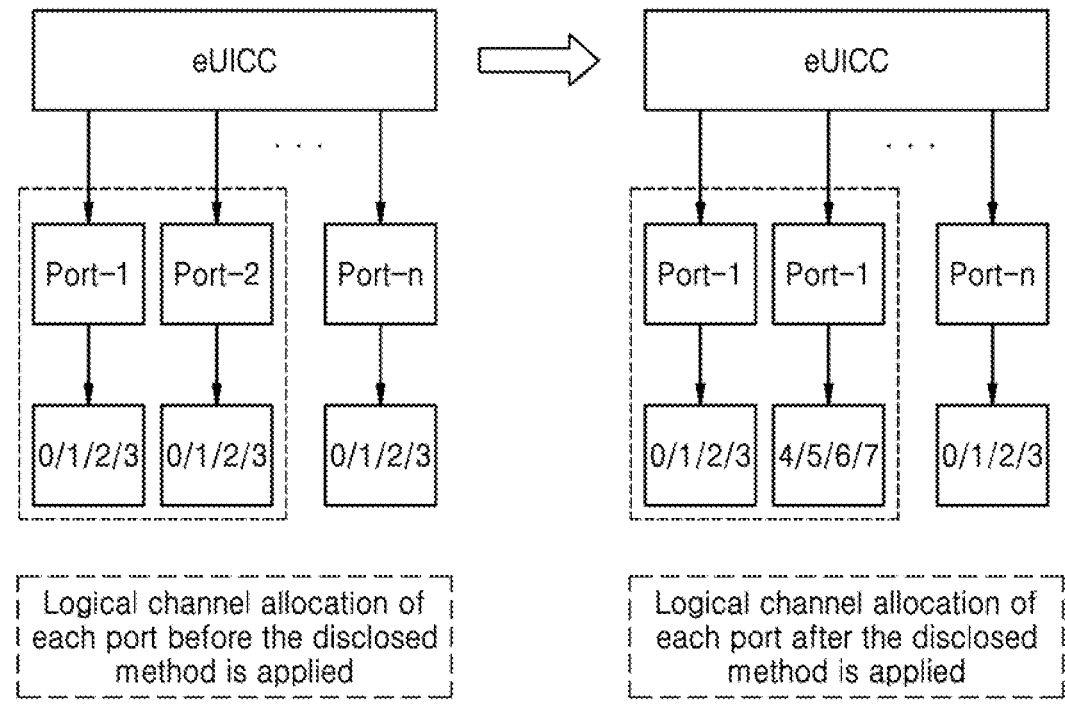
FIG. 5B illustrates a schematic overview of logical channel allocation in the eUICC, according to an embodiment.

FIG. 5B illustrates a schematic overview of logical channel allocation in the eUICC, according to an embodiment.

In comparison to logical channel allocation of related wireless systems, aspects presented herein may provide for the logical channel allocation for each port to be modified. Referring to FIG. 5B, the logical channels (e.g., first logical channel 0, second logical channel 1, third logical channel 2, and fourth logical channel 3) associated with second port Port-2, which may have been previously inaccessible and/or may not be utilizing the memory, may be made accessible and may become part of the first port Port-1 after the successful execution of the enable profile request for the same profile. That is, the first to fourth logical channels 0 to 3 mapped to second port Port-2 may be sequentially mapped to first port Port-1 and may be associated with the first port Port-1 as fifth logical channel 4, sixth logical channel 5, seventh logical channel 6, and eighth logical channel 7. As a result, memory utilization may be improved, when compared to the related wireless systems, as the previously unused first to fourth logical channels 0 to 3 of second port Port-2 may be associated with an enabled profile and may be accessed by the modem.

In one or more embodiments, the modem may receive a request to open a new logical channel when no more logical channels are available to be opened. In response, the modem may query the status of available ports to check if any closed ports are available and/or may issue an enable profile command with the closed port indication. For example, the modem may issue an enable profile APDU by setting a refresh flag as off.

Figure 6A:
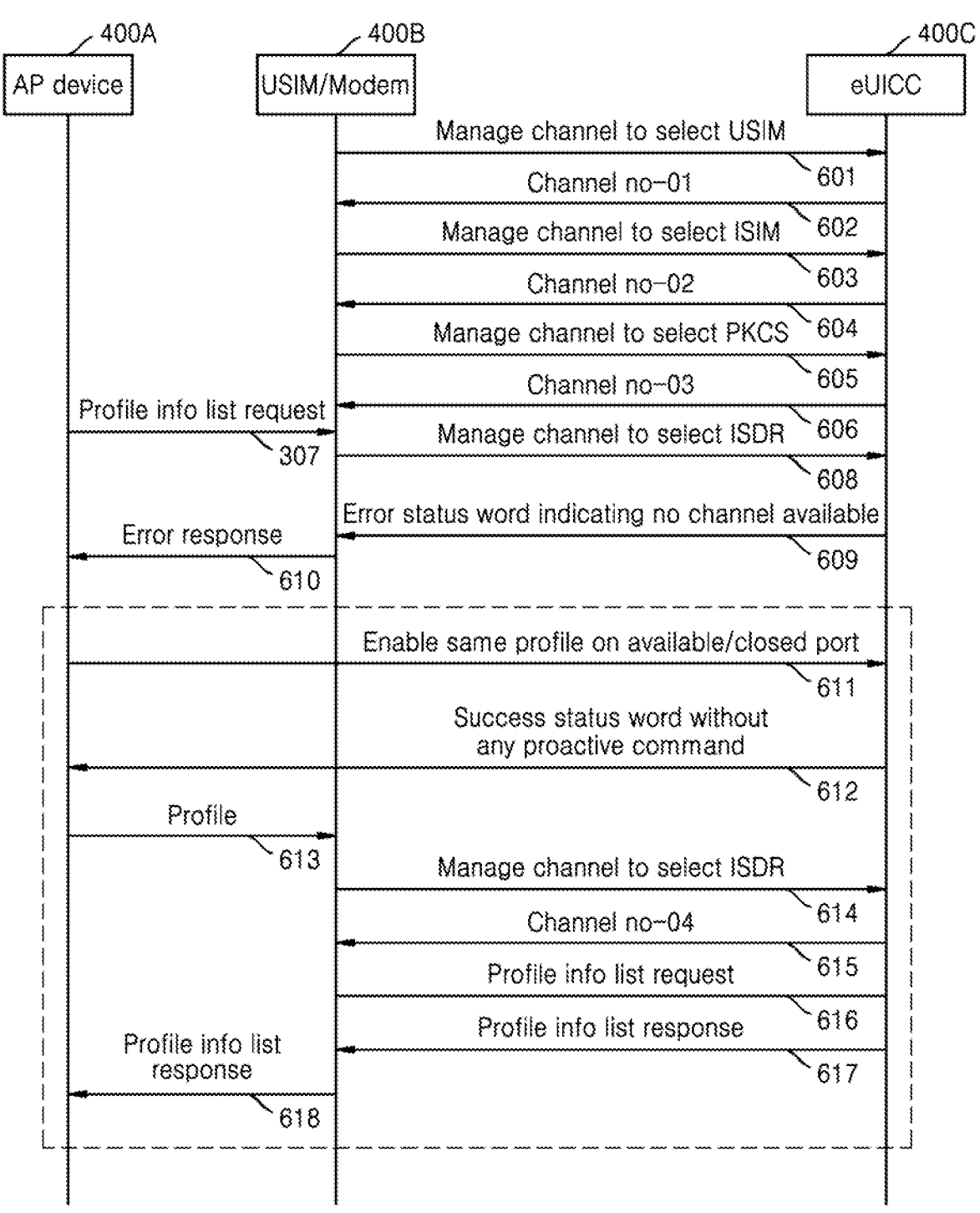
FIGS. 6A and 6B are sequence diagrams illustrating one or more scenarios for extending one or more static resources in the MEP capable eUICC, according to an embodiment.
Figure 6B:
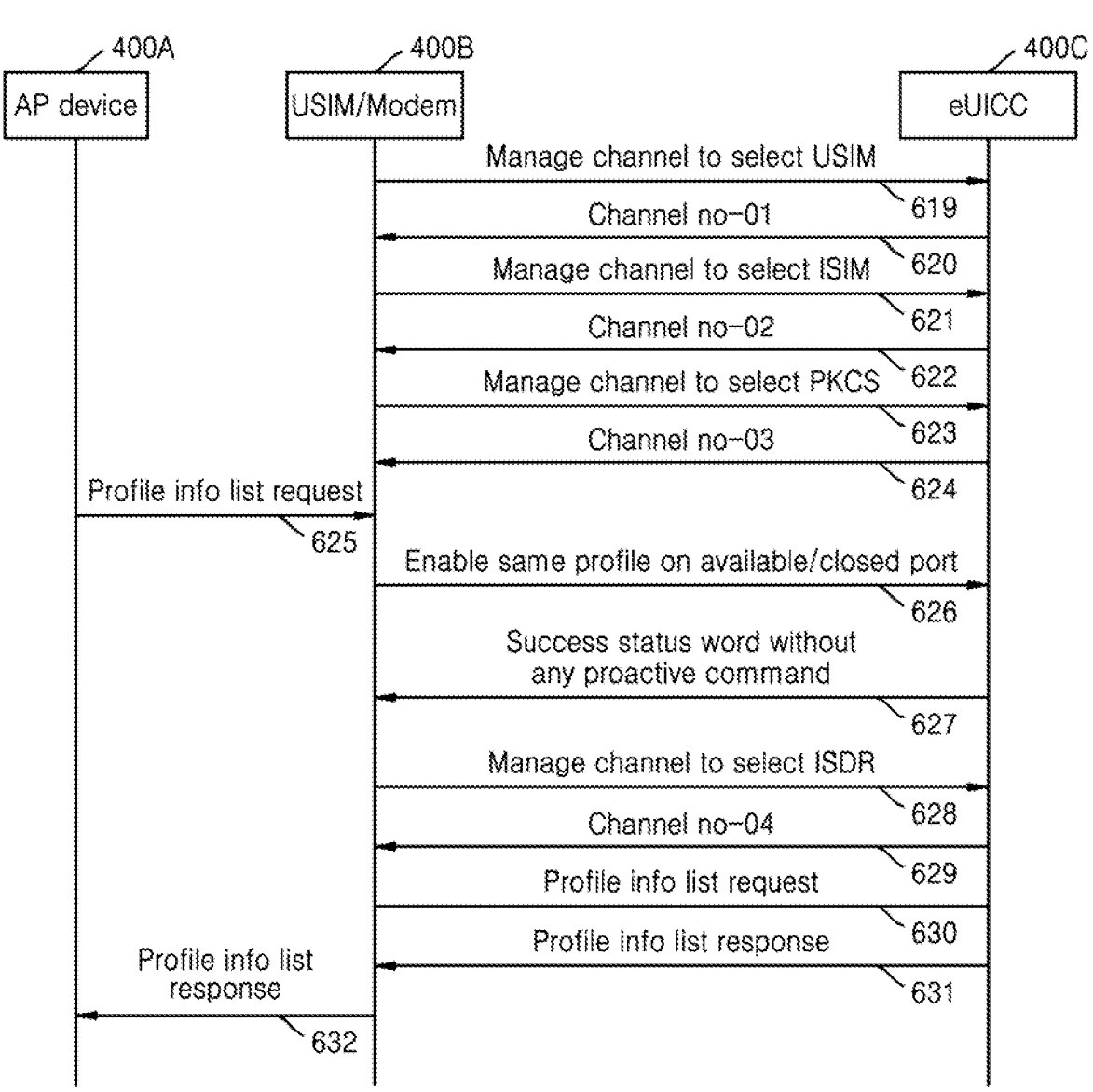

FIGS. 6A, and 6B are sequence diagrams illustrating one or more scenarios for extending one or more static resources in the MEP capable eUICC, according to an embodiment.

Referring to FIG. 6A, at operation 601, the USIM/modem 400B may send a manage channel command to select the USIM application and may request the eUICC 400C to open a logical channel associated with the first port for accessing the USIM application. At operation 602, upon receipt of the manage channel command, the eUICC 400C may respond by allocating channel number 01 to the USIM/modem 400B. As a result, the USIM/modem 400B may establish communication with the USIM application through the allocated logical channel (e.g., channel number 01). At operation 603, the USIM/modem 400B may send a manage channel command to select the ISIM application and may request the eUICC 400C to open a logical channel associated with the first port for accessing the ISIM application. At operation 604, upon receipt of the manage channel command, the eUICC 400C may respond by allocating channel number 02 to the USIM/modem 400B. As a result, the USIM/modem 400B may establish communication with the ISIM application through the allocated logical channel (e.g., channel number 02). At operation 605, the USIM/modem 400B may send a manage channel command to select the PKCS application and may request the eUICC 400C to open a logical channel associated with the first port for accessing the PKCS application. At operation 606, upon receipt of the manage channel command, the eUICC may respond by allocating channel number 03 to the USIM/modem 400B. As a result, the USIM/modem 400B may establish communication with the PKCS application through the allocated logical channel (e.g., channel number 03).

At operation 607, the USIM/modem 400B may receive a profile info list request from the AP device 400A. At operation 608, upon receipt of the profile info list request, the USIM/modem 400B may send a manage channel command to select the ISDR application and may request the eUICC 400C to open a logical channel associated with the first port for accessing the ISDR application. At operation 609, upon receipt of the manage channel command, the eUICC 400C may respond by sending an error status word indicating that no channel is available to allocate. At operation 610, upon receipt of the error status word indicating that no channel is available, the USIM/modem 400B may send an error response to the AP device 400A.

At operation 611, upon receipt of the error response, the AP device 400A may send a manage channel command to enable the same profile, which may be associated with the first port, on the second port of the plurality of ports (e.g., using SGP.22 enableProfile function). The enabling of the same profile may be based on the result of determinations, which may include determining whether the port extension feature is supported by the eUICC 400C, and/or whether the second port of the plurality of ports is available for access/ allocation. At operation 612, the AP device 400A may receive a success status word without any proactive command from the eUICC 400C. That is, the AP device 400A may receive a positive response from the eUICC 400C without the eUICC 400C initiating any proactive actions and/or commands, and thus, the USIM/modem 400B may access additional logical channels (e.g., twice). At operation 613, the AP device 400A may send, upon receipt of the success status word, profile information to the USIM/modem 400B.

At operation 614, upon receipt of the profile info list request, the USIM/modem 400B may send a manage channel command to select the ISDR application and may request the eUICC 400C to open a logical channel associated with the second port for accessing the ISDR application. At operation 615, upon receipt of the manage channel command, the eUICC 400C may respond by allocating channel number 04 to the USIM/modem 400B. As a result, the USIM/modem 400B may establish communication with the ISDR application through the allocated logical channel (e.g., channel number 04). At operation 616, the USIM/ modem 400B may send a profile info list request to the eUICC 400C. At operations 617 and 618, upon receipt of the profile info list request, the eUICC 400C may send a profile info list response to the AP device 400A via the USIM/ modem 400B. That is, when the AP device 400A initiates the transmission of the profile info list request (operation 607), the USIM/modem 400B may send the manage channel command (operation 608) and subsequently may receive an error response (operation 610). If the port extension feature is activated and/or enabled, the transmission of the profile info list request (operation 607) to the eUICC 400C may occur, and the profile info list response (operation 617) may be received from the eUICC 400C.

In one or more embodiments, the USIM/modem 400B may have the capability to access an increased (e.g., double) number of logical channels, which may lead to a reduction in APDU exchange and may provide technical advantages that may be needed by the USIM/modem 400B to select additional applications, when compared to related wireless systems. Aspects of the present disclosure may be applied during a card session, for example, until a cold/warm and/or managed LSI reset has been issued. Aspects of the present disclosure may provide for an improved user experience by potentially avoiding and/or reducing denial of service scenarios for the user. In one embodiment, the eUICC 400C may allocate a dedicated logical channel for ISDR. Regardless of the scenario, the eUICC 400C may not assign the dedicated logical channel number to any application. Consequently, the ISDR may be directly selected using the select command with CLA (instruction class) indicating the dedicated logical channel.

Referring to FIG. 6B, at operation 619, the USIM/modem 400B may send a manage channel command to select the USIM application and may request the eUICC 400C to open a logical channel associated with the first port for accessing the USIM application. At operation 620, upon receipt of the manage channel command, the eUICC 400C may respond by allocating channel number 01 to the USIM/modem 400B. As a result, the USIM/modem 400B may establish communication with the USIM application through the allocated logical channel (e.g., channel number 01). At operation 621, the USIM/modem 400B may send a manage channel command to select the ISIM application and may request the eUICC 400C to open a logical channel associated with the first port for accessing the ISIM application. At operation 622, upon receipt of the manage channel command, the eUICC 400C may respond by allocating channel number 02 to the USIM/modem 400B. As a result, the USIM/modem 400B may establish communication with the ISIM application through the allocated logical channel (e.g., channel number 02). At operation 623, the USIM/modem 400B may send a manage channel command to select the PKCS application and may request the eUICC 400C to open a logical channel associated with the first port for accessing the PKCS application. At operation 624, upon receipt of the manage channel command, the eUICC may respond by allocating channel number 03 to the USIM/modem 400B. As a result, the USIM/modem 400B may establish communication with the PKCS application through the allocated logical channel (e.g., channel number 03).

At operation 625, the USIM/modem 400B may receive a profile info list request from the AP device 400A. At operation 626, upon receipt of the profile info list request, the USIM/modem 400B may send a manage channel command to enable the same profile, which may be associated with the first port, on the second port of the plurality of ports (e.g., using SGP.22 enableProfile function). The enabling of the same profile may be based on the result of determinations, which may include determining whether the port extension feature is supported by the eUICC 400C, and/or whether the second port of the plurality of ports is available for access/allocation. At operation 627, the USIM/modem 400B may receive a success status word without any proactive command from the eUICC 400C. That is, the USIM/modem 400B may receive a positive response from the eUICC 400C without the eUICC 400C initiating any proactive actions and/or commands, and thus, the USIM/modem 400B may access an increased number of logical channels (e.g., double).

At operation 628, upon receipt of the success status word, the USIM/modem 400B may send a manage channel command to select the ISDR application and may request the eUICC 400C to open a logical channel associated with the second port for accessing the ISDR application. At operation

629, upon receipt of the manage channel command, the eUICC 400C may respond by allocating channel number 04 to the USIM/modem 400B. As a result, the USIM/modem 400B may establish communication with the ISDR application through the allocated logical channel (e.g., channel number 04). At operation 630, the USIM/modem 400B may send a profile info list request to the eUICC 400C. At operations 631 and 632, upon receipt of the profile info list request, the eUICC 400C may send a profile info list response to the AP device 400A via the USIM/modem 400B.

FIGS. 7A to 7D are sequence diagrams illustrating one or more scenarios for extending one or more static resources in the MEP capable eUICC, according to an embodiment.

Referring to FIG. 7A, at operation 701, the USIM/modem 400B may send a manage channel command to select the USIM application and may request the eUICC 400C to open a logical channel associated with the first port for accessing the USIM application. At operation 702, upon receipt of the manage channel command, the eUICC 400C may respond by allocating channel number 01 to the USIM/modem 400B. As a result, the USIM/modem 400B may establish communication with the USIM application through the allocated logical channel (e.g., channel number 01). At operation 703, the USIM/modem 400B may send a manage channel command to select the ISIM application and may request the eUICC 400C to open a logical channel associated with the first port for accessing the ISIM application. At operation 704, upon receipt of the manage channel command, the eUICC 400C may respond by allocating channel number 02 to the USIM/modem 400B. As a result, the USIM/modem 400B may establish communication with the ISIM application through the allocated logical channel (e.g., channel number 02). At operation 705, the USIM/modem 400B may send a manage channel command to select the PKCS application and may request the eUICC 400C to open a logical channel associated with the first port for accessing the PKCS application. At operation 706, upon receipt of the manage channel command, the eUICC may respond by allocating channel number 03 to the USIM/modem 400B. As a result, the USIM/modem 400B may establish communication with the PKCS application through the allocated logical channel (e.g., channel number 03).

At operation 708, the USIM/modem 400B may send a manage channel command to select a contact registry service (CRS) applet and may request the eUICC 400C to open a logical channel associated with the first port for accessing the CRS applet to manage radio resources in the wireless communication network. For example, the manage channel command may be used to establish communication with the eUICC 400C and request the opening of a logical channel associated with the first port for accessing the CRS applet. At operation 709, upon receipt of the manage channel command, the eUICC 400C may respond by sending an error status word indicating that no channel is available to allocate. At operation 710, upon receipt of the error status word indicating that no channel is available, the USIM/modem 400B may send an error response to the AP device 400A.

At operation 711, upon receipt of the error response, the AP device 400A may send a manage channel command to enable the same profile, which may be associated with the first port, on the second port of the plurality of ports (e.g., using SGP.22 enableProfile function). The enabling of the same profile may be based on the result of determinations, which may include determining whether the port extension feature is supported by the eUICC 400C, and/or whether the second port of the plurality of ports is available for access/ allocation. At operation 712, the AP device 400A may receive a success status word without any proactive command from the eUICC 400C. That is, the AP device 400A may receive a positive response from the eUICC 400C without the eUICC 400C initiating any proactive actions and/or commands, and thus, the USIM/modem 400B may access an increased number of the logical channels (e.g., double).

At operation 713, upon receipt of the profile info list request, the USIM/modem 400B may send a manage channel command to select the CRS applet and may request the eUICC 400C to open a logical channel associated with the second port for accessing the CRS applet. At operation 714, upon receipt of the manage channel command, the eUICC 400C may respond by allocating channel number 04 to the USIM/modem 400B. As a result, the USIM/modem 400B may establish communication with the CRS applet application through the allocated logical channel (e.g., channel number 04). That is, the manage channel command may be and/or may include a control signal that may instruct the eUICC 400C to allocate resources for the logical channel and to establish a communication link between the USIM/modem 400B and the CRS applet. The logical channel may provide a pathway for data exchange and control signaling between the USIM/modem 400B and the CRS applet. Once the logical channel is established, the USIM/modem 400B may interact with the CRS applet to perform tasks related to radio resource management, such as, but not limited to, handover management, interference mitigation, and load balancing. The interaction between the USIM/modem 400B and the CRS applet may provide for the USIM/modem 400B to access and/or utilize the functionalities of the CRS applet for optimizing the allocation of radio resources in the wireless network.

Referring to FIG. 7B, at operation 715, the USIM/modem 400B may send a manage channel command to select the USIM application and may request the eUICC 400C to open a logical channel associated with the first port for accessing the USIM application. At operation 716, upon receipt of the manage channel command, the eUICC 400C may respond by allocating channel number 01 to the USIM/modem 400B. As a result, the USIM/modem 400B may establish communication with the USIM application through the allocated logical channel (e.g., channel number 01). At operation 717, the USIM/modem 400B may send a manage channel command to select the ISIM application and may request the eUICC 400C to open a logical channel associated with the first port for accessing the ISIM application. At operation 718, upon receipt of the manage channel command, the eUICC 400C may respond by allocating channel number 02 to the USIM/modem 400B. As a result, the USIM/modem 400B may establish communication with the ISIM application through the allocated logical channel (e.g., channel number 02). At operation 719, the USIM/modem 400B may send a manage channel command to select the PKCS application and may request the eUICC 400C to open a logical channel associated with the first port for accessing the PKCS application. At operation 720, upon receipt of the manage channel command, the eUICC may respond by allocating channel number 03 to the USIM/modem 400B. As a result, the USIM/modem 400B may establish communication with the PKCS application through the allocated logical channel (e.g., channel number 03).

At operations 721 and 722, the USIM/modem 400B may receive a manage channel command to a CRS applet from the AP device 400A. In one embodiment, the USIM/modem 400B may maintain a count of free logical channels and detect whether there is no available logical channel. At operation 723, upon detecting that there is no available logical channel, the USIM/modem 400B may send a manage channel command to enable the same profile, which may be associated with the first port, on the second port of the plurality of ports (e.g., using SGP.22 enableProfile function). The enabling of the same profile may be based on the result of determinations, which may include determining whether the port extension feature is supported by the eUICC 400C, and/or whether the second port of the plurality of ports is available for access/allocation. At operation 724, the USIM/modem 400B may receive a success status word without any proactive command from the eUICC 400C. That is, the USIM/modem 400B may receive a positive response from the eUICC 400C without the eUICC 400C initiating any proactive actions and/or commands, and thus, the USIM/modem 400B may access an increased number of the logical channels (e.g., double).

At operation 725, upon receipt of success status word, the USIM/modem 400B may send a manage channel command to select the CRS applet and may request the eUICC 400C to open a logical channel associated with the second port for accessing the CRS applet. At operation 726, upon receipt of the manage channel command, the eUICC 400C may respond by allocating channel number 04 to the USIM/modem 400B. As a result, the USIM/modem 400B may establish communication with the CRS applet application through the allocated logical channel (e.g., channel number 04).

Referring to FIG. 7C, at operation 727, the USIM/modem 400B may send a manage channel command to select the USIM application and may request the eUICC 400C to open a logical channel associated with the first port for accessing the USIM application. At operation 728, upon receipt of the manage channel command, the eUICC 400C may respond by allocating channel number 01 to the USIM/modem 400B. As a result, the USIM/modem 400B may establish communication with the USIM application through the allocated logical channel (e.g., channel number 01). At operation 729, the USIM/modem 400B may send a manage channel command to select the ISIM application and may request the eUICC 400C to open a logical channel associated with the first port for accessing the ISIM application. At operation 730, upon receipt of the manage channel command, the eUICC 400C may respond by allocating channel number 02 to the USIM/modem 400B. As a result, the USIM/modem 400B may establish communication with the ISIM application through the allocated logical channel (e.g., channel number 02). At operation 731, the USIM/modem 400B may send a manage channel command to select the PKCS application and may request the eUICC 400C to open a logical channel associated with the first port for accessing the PKCS application. At operation 732, upon receipt of the manage channel command, the eUICC may respond by allocating channel number 03 to the USIM/modem 400B. As a result, the USIM/modem 400B may establish communication with the PKCS application through the allocated logical channel (e.g., channel number 03).

At operations 733 and 734, the USIM/modem 400B may receive a manage channel command to a CRS applet from the AP device 400A. In one embodiment, the USIM/modem 400B maintains a count of free logical channels and detects that there is no available logical channel. At operation 735, upon detecting that there is no available logical channel, the USIM/modem 400B may send a manage channel command to enable the same profile, which may be associated with the first port, on the second port of the plurality of ports (e.g., using SGP.22 enableProfile function), using any new and/or proprietary APDU. The enabling of the same profile may be based on the result of determinations, which may include determining whether the port extension feature is supported by the eUICC 400C, and/or whether the second port of the plurality of ports is available for access/allocation. At operation 736, the USIM/modem 400B may receive a proprietary status word indicating success response from the eUICC 400C. That is, the USIM/modem 400B may receive a positive response from the eUICC 400C, and thus, the USIM/modem 400B may access an increased number of the logical channels (e.g., double).

At operation 737, upon receipt of success status word, the USIM/modem 400B may send a manage channel command to select the CRS applet and may request the eUICC 400C to open a logical channel associated with the second port for accessing the CRS applet. At operation 738, upon receipt of the manage channel command, the eUICC 400C may respond by allocating channel number 04 to the USIM/modem 400B. As a result, the USIM/modem 400B may establish communication with the CRS applet application through the allocated logical channel (e.g., channel number 04).

Referring to FIG. 7D, at operation 739, the USIM/modem 400B may send a manage channel command to the eUICC 400C to manage LSI (e.g., configure LSI) indicating support of extend/reduce LSI. At operation 740, upon receipt of the manage channel command, the eUICC 400C may respond by sending a manage LSI (e.g., configure LSI) response indicating support of extend/reduce LSI. At operation 741, the USIM/modem 400B may send a manage channel command to select the USIM application and may request the eUICC 400C to open a logical channel associated with the first port for accessing the USIM application. At operation 742, upon receipt of the manage channel command, the eUICC 400C may respond by allocating channel number 01 to the USIM/modem 400B. As a result, the USIM/modem 400B may establish communication with the USIM application through the allocated logical channel (e.g., channel number 01). At operation 743, the USIM/modem 400B may send a manage channel command to select the ISIM application and may request the eUICC 400C to open a logical channel associated with the first port for accessing the ISIM application. At operation 744, upon receipt of the manage channel command, the eUICC 400C may respond by allocating channel number 02 to the USIM/modem 400B. As a result, the USIM/modem 400B may establish communication with the ISIM application through the allocated logical channel (e.g., channel number 02). At operation 745, the USIM/modem 400B may send a manage channel command to select the PKCS application and may request the eUICC 400C to open a logical channel associated with the first port for accessing the PKCS application. At operation 746, upon receipt of the manage channel command, the eUICC may respond by allocating channel number 03 to the USIM/modem 400B. As a result, the USIM/modem 400B may establish communication with the PKCS application through the allocated logical channel (e.g., channel number 03).

At operation 747, the USIM/modem 400B may receive a profile info list request from the AP device 400A. At operation 748, upon receipt of the profile info list request, the USIM/modem 400B may send a manage channel command to select the ISDR application and may request the eUICC 400C to open a logical channel associated with the first port for accessing the ISDR application. At operation 749, upon receipt of the manage channel command, the eUICC 400C may respond by sending an error status word indicating that no channel is available to allocate. At operation 750, upon receipt of the error status word indicating that no channel is available, the USIM/modem 400B may send an error response to the AP device 400A.

At operation 751, the USIM/modem 400B may send a manage channel command to the eUICC 400C to manage LSI (e.g., extend LSI) in response to detecting that no channel available to allocate. At operation 752, upon receipt of the manage LSI (e.g., extend LSI), the eUICC 400C may respond by sending a message (e.g., 9000) to the USIM/modem 400B. The message may serve as a confirmation and/or acknowledgment of the command being received and being processed successfully. At operation 753, the USIM/modem 400B may send a manage channel command to the eUICC 400C to manage/determine the retrieving information and/or LSI (e.g., retrieve LSI). At operation 754, upon receipt of the manage LSI (e.g., retrieve LSI), the eUICC 400C may respond by sending information associated with a total number of managed LSI available to be used, to merge the one or more static resources of the at least one second port with the one or more static resources of the first port. At operation 755, upon receipt of the total number of managed LSI available to be used, the USIM/modem 400B may send a manage channel command to select the ISDR application and may request the eUICC 400C to open a logical channel associated with the second port for accessing the ISDR application. At operation 756, upon receipt of the manage channel command, the eUICC 400C may respond by allocating channel number 04 to the USIM/modem 400B. As a result, the USIM/modem 400B may establish communication with the ISDR application through the allocated logical channel (e.g., channel number 04). At operation 757, the USIM/modem 400B may send a profile info list request to the eUICC 400C. At operations 758 and 759, upon receipt of the profile info list request, the eUICC 400C may send a profile info list response to the AP device 400A via the USIM/modem 400B.

In one or more embodiments, the update on the extend/reduce LSI may include the management of the LSI to indicate the extension and/or reduction of the current LSI. The LSI may be extended by adding to the current LSI all associated resources such as logical channels and memory that may not be linked with any LSE. Alternatively or additionally, the LSI may be reduced by disassociating the extended LSI resource from the current LSI and making available the original LSI for extending and/or enabling a new LSE. After the extension and/or reduction of LSI, the terminal may retrieve the associated resources using the manage LSI (e.g., retrieve resource) command. In an embodiment, the APDU may only be used if the configuration is agreed upon using LSI management (e.g., configure LSI) and/or unless pre-agreed.

In one or more embodiments, the configuration linked to the first port may correspond with the port configuration shown in Table 1. The LSI options configuration may correspond with the options configuration shown in Table 2. When retrieving LSI information, the response may include the information shown in Table 3.

TABLE 1

| | | | | | | | | Port Configuration |
|---|---|---|---|---|---|---|---|---|
| b8 | b7 | b6 | b5 | b4 | b3 | b2 | b1 | Meaning |
| 0 | 0 | 0 | 0 | 0 | 0 | 0 | 0 | Select LSI - Lc and Le not present (see note 2) |
| 0 | 0 | 0 | 0 | 0 | 0 | 0 | 1 | Reset LSE - Lc not present, Le present and set to '00' |
| 0 | 0 | 0 | 0 | 0 | 0 | 1 | 0 | Assign SWP - Lc not present, Le present and set to '00' |
| 0 | 0 | 0 | 0 | 0 | 0 | 1 | 1 | Retrieve SWP - P2 set to '00', Lc not present, Le present and set to '00' |
| 0 | 0 | 0 | 0 | 0 | 1 | 0 | 0 | Configure LSIs - P2 set to '00', Lc and data present, Le present and set to '00' |
| 0 | 0 | 0 | 0 | 0 | 1 | 0 | 1 | Extend LSI - P2 set to '00', LC not present, Le not present. |
| 0 | 0 | 0 | 0 | 0 | 1 | 1 | 0 | Reduce LSI - P2 set to '01', LC not present, Le not present |

Note 1:
All other values may be reserved for future use (RFU).
Note 2:
If the NAD byte is used to select the LSI, this command may not be used by the terminal.

TABLE 2

| | | | | | | | | LSI Options |
|---|---|---|---|---|---|---|---|---|
| b8 | b7 | b6 | b5 | b4 | b3 | b2 | b1 | Meaning |
| — | — | — | — | — | — | — | x | 1: LSI indication via NAD byte supported/used 0: LSI indication via NAD byte not supported/ not used |
| — | — | — | — | — | — | x | — | 1: Terminal support extend/reduce LSI 0: Terminal does not support extend/reduce LSI |
| x | x | x | x | x | x | x | — | RFU may be set to 0 |

TABLE 3

| | | LSI Response | | |
|---|---|---|---|---|
| Byte | Description | | Value | Length |
| 1 | Tag for the number of logical channels assigned to LSI | | '80' | 1 |
| 2 | Length of next field | | 1 | 1 |
| 3 | Number of logical channels associated with LSI | | | 1 |

In one or more embodiments, if the USIM/modem 400B receives a request to open a new logical channel in a situation where no more logical channels are available, the USIM/modem 400B may query the status of available port to check if any closed ports are available and/or may issue an enable profile command with the closed port indication. For example, the USIM/modem 400B may perform at least one of following actions.

(a) The USIM/modem 400B may issue the manage LSI (e.g., extend LSI) APDU.

(b) The eUICC 400C, upon receiving the APDU, may perform at least one of the following actions: (i) reject the request with an error code (e.g., 6985), and (ii) process the enableProfile function with a success status word.

(c) On successful execution: (i) the eUICC 400C may associate all the static resources with the enabled profile, (ii) all new sets of logical channels assigned from the port may be treated as closed, (iii) logical channel numbering may follow sequentially from the previously supported logical channel of the same pro- file, (iv) no notification may be generated for enabling the profile, and (v) the eUICC 400C may not report the additional port details in the GetProfileInfo request.

(d) On rejecting the enable profile request: (i) to avoid the error code, the USIM/modem 400B may query Get-ProfileInfo to determine if any closed port is available with the eUICC, (ii) once the request is rejected, the USIM/modem 400B may either reject the incoming open channel request with an appropriate status word or close any existing logical channel and process the request. The same steps may need to be repeated to reach the original context, and (iii) in both scenarios, a degraded user experience may be observed.

If the LPA and/or USIM/modem 400B needs to exit this configuration at any time, the LPA and/or USIM/modem 400B may send a manage LSI (e.g., reduce LSI) command to the eUICC 400C. The eUICC 400C may release the additional associated port. If, during the above configuration, a user attempts to enable another profile on the target port, the first manage LSI (e.g., reduce LSI) command may be executed on the target port followed by a request to enable the profile.

FIG. 8 is a flow diagram illustrating a method 800 for extending the one or more static resources in the MEP capable eUICC 400C, according to another embodiment.

At operation 801, the method 800 may include receiving, at the network device associated with the UE 400, the request from another network device associated with the UE 400 to allocate at least one static resource, from among the one or more static resources, at the first port of the eUICC 400C for accessing the at least one application. At operation 802, the method 800 may include determining, upon receiving the request, whether the at least one static resource is available at the first port for allocation. At operation 803, the method 800 may include determining, in response to determining that the at least one static resource is not available at the first port, whether the port extension feature is supported by the eUICC 400C, and whether at least one second port of the plurality of ports is available for access. At operation 804, the method 800 may include merging the one or more static resources of the at least one second port with the one or more static resources of the first port in response to determining that the port extension feature is supported by the eUICC 400C and the at least one second port is available for access. At operation 805, the method 800 may include initiating the at least one action associated with the one or more static resources for accessing the received request in response to determining that the port extension feature is not supported by the eUICC 400C and the at least one second port is not available for access. The operations of method 800 may include and/or may be similar in many respects to the operations described above with reference to FIGS. 4, 5A, 5B, 6A, 6B, and 7A to 7D, and may include additional features not mentioned above. Consequently, repeated descriptions of the operations of method 800 described above with reference to FIGS. 4, 5A, 5B, 6A, 6B, and 7A to 7D may be omitted for the sake of brevity.

Aspects of the present disclosure may provide several advantages over related wireless systems, such as, but not limited to the following.

The USIM/modem 400B may enable the same profile on any available port using the EnableProfile function from SGP.22. As described above, the number of available logical channels with the USIM/modem 400B for operation within the profile may be increased. This may result in a reduction in the total APDU exchange between the eUICC 400C and USIM/modem 400B, which may provide an enhanced user experience.

The USIM/modem 400B may enable the same profile on any available port using a proprietary command (e.g., APDU). As described above, the number of available logical channels with the USIM/modem 400B for operation within the profile may be increased, which may result in a reduced APDU exchange between the eUICC 400C and USIM/modem 400B, which may provide an improved user experience.

The USIM/modem 400B may enable the same profile on any available port using the EnableProfile function from SGP.22, and ports without any enabled profile may also have logical channels associated with them. These logical channels may not be accessed by the USIM/modem 400B, which may result in wasted (unused) memory allocation. However, as described above, these logical channels may be associated with an enabled profile, allowing the logical channels to be accessed, and thereby, potentially improving memory utilization.

The USIM/modem 400B may extend the LSE using the manage LSI (e.g., extend/reduce LSI) function from ETSI TS 102 221. Resources linked with LSE that do not have any LSI associated may not be accessible by the USIM/modem 400B, potentially resulting in wasted memory allocation. However, as described above, these resources may be associated with a selected LSI, making the resources accessible, and thereby, potentially improving memory utilization.

Unless otherwise defined, all technical and scientific terms used herein may have the same meaning as commonly understood by one ordinary skilled in the art to which the present disclosure belongs. The system, methods, and examples provided herein are illustrative only and are not intended to be limiting.

While specific language has been used to describe the present disclosure, any limitations arising on account thereto, are not intended. As would be apparent to a person in the art, various working modifications may be made to the method to implement the present disclosure as taught herein. The drawings and the forgoing description give examples of embodiments. Those skilled in the art may appreciate that one or more of the described elements may well be combined into a single functional element. Alternatively or additionally, certain elements may be split into multiple functional elements. For example, elements from one embodiment may be added to another embodiment.

The embodiments disclosed herein may be implemented using at least one hardware device performing network management functions to control the elements.

The foregoing description of the specific embodiments may reveal the general nature of the embodiments herein such that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art may recognize that the embodiments herein may be practiced with modification within the scope of the embodiments as described herein.

What is claimed is:

1. A method for extending one or more static resources in a multiple enabled profile (MEP) capable embedded universal integrated circuit card (eUICC), the method comprising:
    receiving, by a first network device associated with a user equipment (UE) and from a second network device associated with the UE, a request to allocate at least one first static resource, from among the one or more static resources, at a first port of the eUICC, the at least one first static resource being configured to access at least one application, wherein the eUICC comprises a plurality of ports, and each port comprises a predefined number of static resources associated with the one or more static resources and a unique profile;
    determining, based on receiving the request, whether the at least one first static resource is available for allocation at the first port;
    determining, based on determining that the at least one first static resource is unavailable at the first port, whether the eUICC supports a port extension feature, and whether at least one second port of the plurality of ports is available for access; and
    managing the one or more static resources by performing at least one of:
        merging one or more second static resources of the at least one second port with one or more first static resources of the first port based on determining that the eUICC supports the port extension feature and that the at least one second port is available for access; and initiating at least one action associated with the one or more first static resources based on determining that the eUICC does not support the port extension feature or that the at least one second port is not available for access.

2. The method of claim 1, wherein the initiating of the at least one action comprises at least one of:

sending, to an application platform (AP) device associated with the UE, a rejection message comprising a corresponding error code, based on the received request; and terminating at least one allocated static resource associated with the first port and reallocating the at least one terminated static resource associated with the first port configured to access the at least one application associated with the received request.

3. The method of claim 1, further comprising:

enabling, based on the merging of the one or more second static resources, a first unique profile associated with the first port into the at least one second port using an enable profile function configured to access the at least one application associated with the received request.

4. The method of claim 1, further comprising:

enabling, based on the merging the one or more second static resources, a first unique profile associated with the first port into the at least one second port using a proprietary command configured to access the at least one application associated with the received request, wherein the proprietary command comprises an Application Protocol Data Unit (APDU) command.

5. The method of claim 1, wherein the at least one application comprises at least one of a master file (MF) application, a universal subscriber identity module (USIM) application, an IP multimedia services identity module (ISIM) application, a public key cryptographic standards (PKCS) application, a code division multiple access (CDMA) subscriber identity module (SIM) application, and an issuer security domain root (ISDR) application.

6. The method of claim 1, wherein the managing of the one or more static resources further comprises:

determining, based on the merging the one or more second static resources, whether a task associated with the received request is completed;

determining, based on determining that the task is completed, retrieving information associated with the first port, wherein the retrieving information indicates a number of static resources allocated to the first port;

releasing, based on determining that the task is completed, the one or more merged first static resources at the first port; and reallocating the one or more released static resources among the first port and the at least one second port based on an initial static resource configuration.

7. The method of claim 1, comprising:

performing one or more operations associated with at least one of a logical secure element (LSE) and a logical secure element interface (LSI), wherein the LSE is configured to provide a secure storage and process capabilities for sensitive data, wherein the LSI is configured to provide an interface through which one or more applications and one or more services interact with the LSE, wherein the one or more operations comprises an extension operation of the LSI and a reduction operation of the LSI.

8. A system for extending one or more static resources in a multiple enabled profile (MEP) capable embedded universal integrated circuit card (eUICC), the system comprising:

a memory storing instructions;

a communicator; and a processor, operably coupled to the memory and the communicator, wherein the instructions are configured, when executed by the processor, to cause the system to:

receive, by a first network device associated with a user equipment (UE) and from a second network device associated with the UE, a request to allocate at least one first static resource, from among the one or more static resources, at a first port of the eUICC, the at least one first static resource being configured to access at least one application, wherein the eUICC comprises a plurality of ports, and each port comprises a predefined number of static resources associated with the one or more static resources and a unique profile;

determine, based on the request, whether the at least one first static resource is available for allocation at the first port;

determine, based on a determination that the at least one first static resource is unavailable at the first port, whether the eUICC supports a port extension feature, and whether at least one second port of the plurality of ports is available for access; and manage the one or more static resources, wherein to manage the one or more static resources comprises to:

merge the one or more second static resources of the at least one second port with one or more first static resources of the first port based on a determination that the eUICC supports the port extension feature and that the at least one second port is available for access; and initiate at least one action associated with the one or more first static resources based on a determination that the eUICC does not support the port extension feature or that the at least one second port is not available for access.

9. The system of claim 8, wherein the instructions are further configured to cause the system to:

send, to an application platform (AP) device associated with the UE, a rejection message comprising a corresponding error code, based on the received request; and terminate at least one allocated static resource associated with the first port and reallocating the at least one terminated static resource associated with the first port configured to access the at least one application associated with the received request.

10. The system of claim 8, wherein the instructions are further configured to cause the system to:

enable, based on the merge of the one or more second static resources, a first unique profile associated with the first port into the at least one second port using an enable profile function configured to access the at least one application associated with the received request.

11. The system of claim 8, wherein the instructions are further configured to cause the system to:

enable, based on the merge of the one or more second static resources, a first unique profile associated with the first port into the at least one second port using a proprietary command configured to access the at least one application associated with the received request, wherein the proprietary command comprises an application protocol data unit (APDU) command.

12. The system of claim 8, wherein the at least one application comprises at least one of a master file (MF) application, a universal subscriber identity module (USIM) application, an IP multimedia services identity module (ISIM) application, a public key cryptographic standards (PKCS) application, a code division multiple access (CDMA) subscriber identity module (SIM) application, and an issuer security domain root (ISDR) application.

13. The system of claim 8, wherein the instructions are further configured to cause the system to:

determine, based on the merge the one or more second static resources, whether a task associated with the received request is completed;

determine, based on a determination that the task is completed, retrieving information associated with the first port, wherein the retrieving information indicates a number of static resources allocated to the first port;

release, based on the determination that the task is completed, the one or more merged first static resources at the first port; and reallocate the one or more released static resources among the first port and the at least one second port based on an initial static resource configuration.

14. The system of claim 8, the instructions are further configured to cause the system to:

perform one or more operations associated with at least one of a logical secure element (LSE) and a logical secure element interface (LSI), wherein the LSE is configured to provide a secure storage and process capabilities for sensitive data, wherein the LSI is configured to provide an interface through which one or more applications and one or more services interact with the LSE, wherein the one or more operations comprises an extension operation of the LSI and a reduction operation of the LSI.

\* \* \* \* \*